United States Patent
Bill Clark et al.

(10) Patent No.: US 12,479,463 B2
(45) Date of Patent: Nov. 25, 2025

(54) DATA DETERMINING INTERFACE FOR VEHICLE DECISION-MAKING

(71) Applicant: Nissan North America, Inc., Franklin, TN (US)

(72) Inventors: Luis Lorenzo Bill Clark, San Francisco, CA (US); Kyle Hollins Wray, Mountain View, CA (US); David Ilstrup, Santa Cruz, CA (US); Stefan Witwicki, San Carlos, CA (US)

(73) Assignee: Nissan North America, Inc., Franklin, TN (US)

( * ) Notice: Subject to any disclaimer, the term of this patent is extended or adjusted under 35 U.S.C. 154(b) by 429 days.

(21) Appl. No.: 17/977,641

(22) Filed: Oct. 31, 2022

(65) Prior Publication Data

US 2024/0140472 A1 May 2, 2024

(51) Int. Cl.
*B60W 60/00* (2020.01)
*B60W 40/02* (2006.01)

(52) U.S. Cl.
CPC .......... *B60W 60/001* (2020.02); *B60W 40/02* (2013.01); *B60W 2420/408* (2024.01); *B60W 2556/40* (2020.02)

(58) Field of Classification Search
CPC ............... B60W 60/001; B60W 40/02; B60W 2556/40; B60W 2420/408; B60W 2420/403; B60W 2555/60; B60W 4/46; B60W 4/38

See application file for complete search history.

(56) References Cited

U.S. PATENT DOCUMENTS

| | | | |
|---|---|---|---|
| 7,353,110 B2 | 4/2008 | Kim | |
| 12,060,060 B1 * | 8/2024 | Costantino | G06F 16/285 |
| 2016/0318515 A1 * | 11/2016 | Laur | B60W 30/18154 |
| 2017/0031361 A1 * | 2/2017 | Olson | G06V 20/56 |
| 2020/0005645 A1 * | 1/2020 | Wray | G08G 1/166 |
| 2020/0168081 A1 | 5/2020 | Ran et al. | |
| 2020/0250473 A1 | 8/2020 | Elluswamy et al. | |
| 2020/0263996 A1 * | 8/2020 | Gokhale | G01S 17/89 |
| 2021/0163021 A1 * | 6/2021 | Frazzoli | H04W 4/48 |
| 2021/0188297 A1 * | 6/2021 | Wray | B60W 50/0098 |
| 2021/0200208 A1 * | 7/2021 | Wray | B60W 30/0953 |
| 2021/0240190 A1 * | 8/2021 | Wray | G06F 40/186 |

(Continued)

*Primary Examiner* — Justin S Lee
(74) *Attorney, Agent, or Firm* — Young Basile Hanlon & MacFarlane, P.C.

(57) ABSTRACT

Decision-making for a vehicle uses a data determining interface between perception and decision-making. The interface receives, from at least two data sources, operational environment data representing objects external to the vehicle while the vehicle is traversing a vehicle transportation network. The operational environment data is modified to determine output data for data types needed to determine a candidate vehicle control action responsive to the distinct vehicle operation scenario identified using the operational environment data. The solution is the same candidate vehicle control action for the same conditions regardless of the data types available from the data sources. That is, even where different data sources are available, consistent output is provided to a decision-making system. Consistent decision-making results whether the vehicle has a high-definition map, a standard-definition map, or no map as a data source, for example.

20 Claims, 12 Drawing Sheets

(56) References Cited

U.S. PATENT DOCUMENTS

| | | | | |
|---|---|---|---|---|
| 2021/0362734 A1* | 11/2021 | Ge | ........................ | G01S 13/931 |
| 2023/0085147 A1* | 3/2023 | Melnikov | .............. | G05D 1/622 |
| | | | | 701/26 |
| 2024/0054563 A1* | 2/2024 | Shen | ...................... | G06V 20/59 |

\* cited by examiner

DATA DETERMINING INTERFACE FOR VEHICLE DECISION-MAKING

TECHNICAL FIELD

This disclosure relates generally to vehicle operational management and driving, and more particularly to a data determining interface for decision-making in an autonomous or semi-autonomous vehicle.

BACKGROUND

A vehicle may traverse a portion of a vehicle transportation network (e.g., a road). Traversing the portion of the vehicle transportation network may include generating or capturing, such as by a sensor of the vehicle, data, such as data representing an operational environment, or a portion thereof, of the vehicle. Traversing the portion of the vehicle transportation network may include performing an action of autonomous driving in response to the captured data. The action may be selected using artificial intelligence (e.g., trained machine-learning models) or other decision-making models.

SUMMARY

Disclosed herein are aspects, features, elements, implementations, and embodiments of vehicle decision-making using a data determining interface. The data determining interface may be part of a vehicle decision-making system used to traverse a vehicle transportation network using variegated data.

An aspect of the disclosed embodiments is an apparatus for vehicle decision-making. The apparatus can include a perception system configured to produce, while a vehicle is traversing a vehicle transportation network, operational environment data using at least two data sources, wherein the operational environment data includes data associated with objects external to the vehicle, and to identify, using the operational environment data, a distinct vehicle operation scenario. The apparatus can also include a decision-making component that comprises a scenario-specific operational control evaluation model of the distinct vehicle operation scenario that, when solved, produces a candidate vehicle control action. A data determining interface is between the perception system and the decision-making component. The data determining interface is configured to receive, from the perception system, the operational environment data having operational environment data types, modify the operational environment data to determine output data for data types needed to solve the scenario-specific operational control evaluation model, and transmit the output data to the decision-making component to output the candidate vehicle control action so as to cause the vehicle to perform the candidate vehicle control action for navigating the distinct vehicle operation scenario. The data determining interface modifies the operational environment data so that the output data and hence the candidate vehicle control action are consistent even when the data sources are different. For example, where the operational environment data types comprise first operational environment data types when the at least two data sources comprise first data sources, the operational environment data types comprise second operational environment data types when the at least two data sources comprise second data sources, at least one of the second data sources is different from the first data sources, and at least one of the first operational environment data types is different from the second operational environmental data types, the output data is the same whether the at least two data sources comprise the first data sources or the second data sources.

Another aspect of the disclosed embodiments is apparatus for vehicle decision-making that includes the data determining interface. The data determining interface is configured to receive, while a vehicle is traversing a vehicle transportation network, operational environment data using at least two data sources. The operational environment data includes data associated with objects external to the vehicle and having operational environment data types, and the objects establish a distinct vehicle operation scenario. The data determining interface is also configured to modify the operational environment data to determine output data for data types needed to determine a candidate vehicle control action using a decision-making component and transmit the output data to the decision-making component to output the candidate vehicle control action so as to cause the vehicle to perform a vehicle control action for navigating the distinct vehicle operation scenario within the vehicle transportation network, the vehicle control action selected from any available candidate control action. In some examples, where the operational environment data types comprise first operational environment data types when the at least two data sources comprise first data sources, the operational environment data types comprise second operational environment data types when the at least two data sources comprise second data sources, at least one of the second data sources is different from the first data sources, and at least one of the first operational environment data types is different from the second operational environmental data types, the output data is the same whether the at least two data sources comprise the first data sources or the second data sources.

Another aspect of the disclosed embodiments is a vehicle implementing vehicle decision-making. The vehicle includes a processor configured to receive, while the vehicle is traversing a vehicle transportation network, operational environment data using at least two data sources, wherein the operational environment data includes data associated with an object external to the vehicle, and to identify, using the operational environment data, a distinct vehicle operation scenario. A data determining interface of the vehicle is configured to modify the operational environment data to determine output data for data types needed by a decision-making component to determine a candidate vehicle control action responsive to the distinct vehicle operation scenario and transmit the output data to the decision-making component to determine the candidate vehicle control action. The vehicle also includes a vehicle control component configured to perform a vehicle control action for the distinct vehicle operation scenario, the vehicle control action selected from any available candidate control action. To modify the operational environment data includes to filter out the operational environment data having operational environment data types that differ from the data types needed by the decision-making component to determine the candidate vehicle control action, to generate, using at least some of the operational environment data, the output data for a missing data type of the data types needed by the decision-making component to determine the candidate vehicle control action where the operational environment data types do not include the missing data type, or both.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects disclosed herein will become more apparent by referring to the examples provided in the following description and drawings in which like reference numbers refer to like elements.

DETAILED DESCRIPTION

Figure 1:
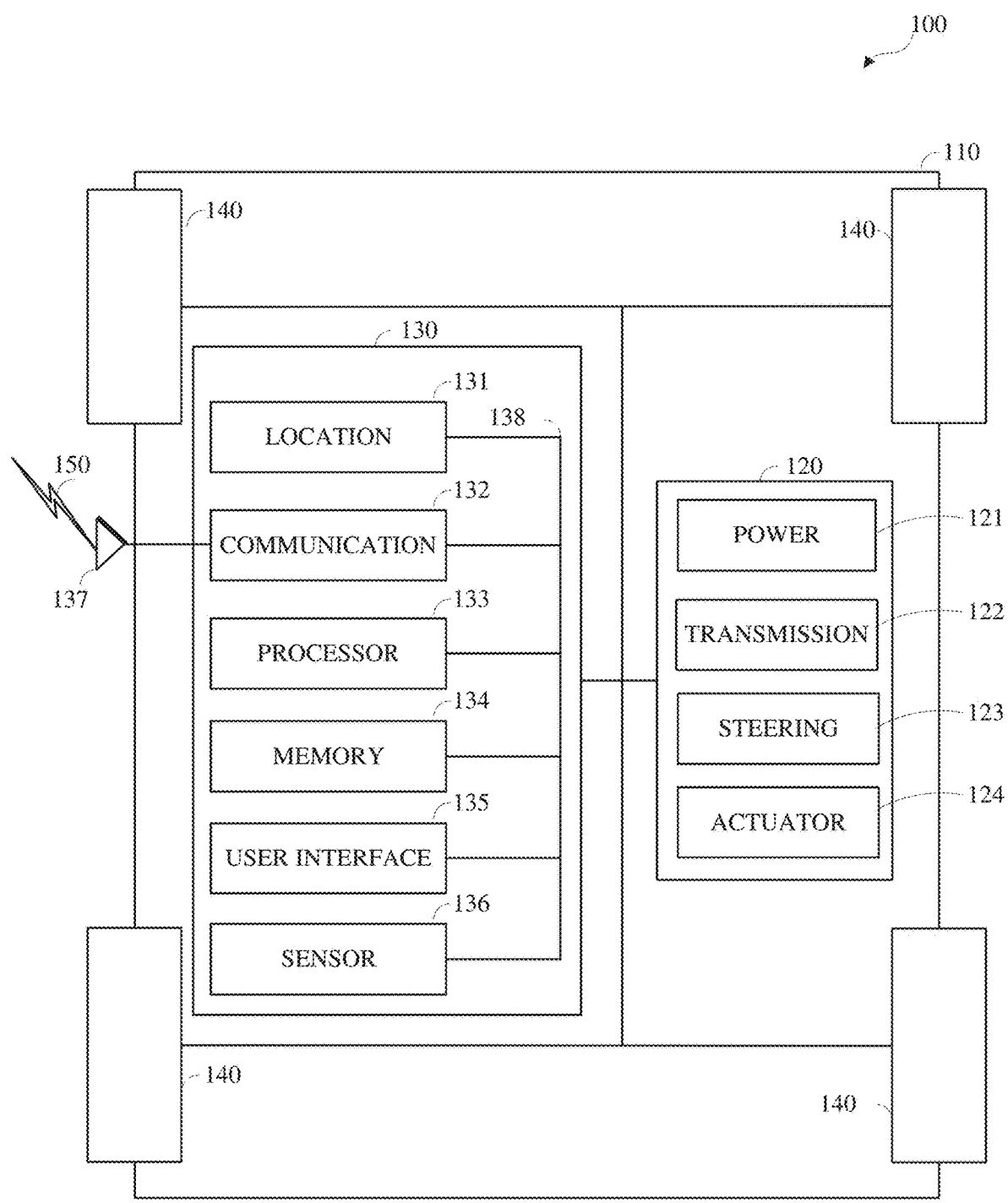
FIG. 1 is a diagram of an example of a vehicle in which the aspects, features, and elements disclosed herein may be implemented.

A vehicle, such as an autonomous vehicle (AV), or a semi-autonomous vehicle, may traverse a portion of a vehicle transportation network. The vehicle may include one or more sensors and traversing the vehicle transportation network may include the sensors generating or capturing sensor data, such as sensor data corresponding to an operational environment of the vehicle, or a portion thereof. For example, the sensor data may include information corresponding to one or more external objects, such as pedestrians, remote vehicles, other objects within the vehicle operational environment, vehicle transportation network geometry, or a combination thereof. As used herein, an AV encompasses a semi-autonomous vehicle. A semi-autonomous vehicle may be, for example, any vehicle including one or more advanced-driver assistance systems (ADAS).

During autonomous driving, and at different time steps (e.g., at every time step), some component (e.g., a decision-making component, module, or model such as a reasoning module, an inference module, or the like) of the AV may determine a respective action for controlling the AV in response to sensor information. Thus, at a high level, the component of the AV uses inputs (e.g., sensor data) and produces an output (e.g., the action to control the AV) where the output can be an action for controlling the AV.

The component can be a single component (e.g., module, model, circuitry, etc.), multiple cooperating components, or a command arbitration module (e.g., an executor or an autonomous vehicle operational management controller) that receives inputs (e.g., candidate actions) from multiple components and selects one of the candidate actions as the selected action for controlling the AV.

Certain of the components may be referred to as decision or decision-making components herein. Each decision component recommends an action based on a belief state of the operational environment of the vehicle (e.g., a state based on the locations of objects and the AV, headings, speed, etc.). The recommendation of an action that is a correct action (e.g., one that is appropriate for the vehicle based on the operational environment of the vehicle) depends upon accurate information about that operational environment.

Conventionally, there are two main categories of maps used for vehicle navigation—high-definition (HD) maps and standard-definition (SD) maps. In general, HD maps are constructed using vehicles respectively equipped with high-end, 3D sensors, cameras, and a global positioning system (GPS) unit. The sensors create a detailed 3D map of the world, and the data is geotagged using highly accurate GPS units. The exact location of traffic sings, road edges, lane markings, etc., may be included. Conversely, SD maps contain information at the topological level, where road feature locations are approximate, such as at one meter level of accuracy, and may exclude individual road lanes of an entire road.

HD maps have been the default navigation tool to use when it comes to prototyping and testing an AV. In addition to using HD maps for navigation, an AV can utilize sensors that provide a relatively good understanding of the world, such as cameras and light detection and ranging (LiDARS). Unfortunately, some of these sensors (particularly LiDARS) have a high price tag. Moreover, HD maps also come with a high price tag and may not capture areas through which an AV is traveling as opposed to where prototyped and tested, particularly given the millions of miles of roads worldwide. This raises the question of whether such detailed information is need for the decision components to recommend a correct action.

Described herein is a vehicle decision-making system that includes a data determining interface that allows a vehicle to navigate through an environment using various types of sensors and map information. The interface lies between perception and decision-making, taking inputs from sensors and map(s), where available, and providing a consistent, acceptable output to the decision-making components of an AV. The interface addresses situations where multiple types of data are available, but the decision-making components or modules need specific data types as input. In some cases, the interface may define the specific data types needed and generate those inputs from the multiple types of data when the specific data types are not available. The specific data types may be the minimum data types for a particular decision-making module that are needed to consistently recommend an acceptable (e.g., the correct) action.

The data determining interface and the vehicle decision-making system in which it can be used are discussed in more detail below after an initial description of a vehicle with which the invention may be used.

FIG. 1 is a diagram of an example of a vehicle in which the aspects, features, and elements disclosed herein may be implemented. As shown, a vehicle 100 includes a chassis 110, a powertrain 120, a controller 130, and wheels 140. Although the vehicle 100 is shown as including four wheels 140 for simplicity, any other propulsion device or devices, such as a propeller or tread, may be used. In FIG. 1, the lines interconnecting elements, such as the powertrain 120, the controller 130, and the wheels 140, indicate that information, such as data or control signals, power, such as electrical power or torque, or both information and power, may be communicated between the respective elements. For example, the controller 130 may receive power from the powertrain 120 and may communicate with the powertrain 120, the wheels 140, or both, to control the vehicle 100, which may include accelerating, decelerating, steering, or otherwise controlling the vehicle 100.

As shown, the powertrain 120 includes a power source 121, a transmission 122, a steering unit 123, and an actuator 124. Other elements or combinations of elements of a powertrain, such as a suspension, a drive shaft, axles, or an exhaust system may be included. Although shown separately, the wheels 140 may be included in the powertrain 120.

The power source 121 may include an engine, a battery, or a combination thereof. The power source 121 may be any device or combination of devices operative to provide energy, such as electrical energy, thermal energy, or kinetic energy. For example, the power source 121 may include an engine, such as an internal combustion engine, an electric motor, or a combination of an internal combustion engine and an electric motor and may be operative to provide kinetic energy as a motive force to one or more of the wheels 140. The power source 121 may include a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 122 may receive energy, such as kinetic energy, from the power source 121, and may transmit the energy to the wheels 140 to provide a motive force. The transmission 122 may be controlled by the controller 130 the actuator 124 or both. The steering unit 123 may be controlled by the controller 130 the actuator 124 or both and may control the wheels 140 to steer the vehicle. The actuator 124 may receive signals from the controller 130 and may actuate or control the power source 121, the transmission 122, the steering unit 123, or any combination thereof to operate the vehicle 100.

As shown, the controller 130 may include a location unit 131, an electronic communication unit 132, a processor 133, a memory 134, a user interface 135, a sensor 136, an electronic communication interface 137, or any combination thereof. Although shown as a single unit, any one or more elements of the controller 130 may be integrated into any number of separate physical units. For example, the user interface 135 and the processor 133 may be integrated in a first physical unit and the memory 134 may be integrated in a second physical unit. Although not shown in FIG. 1, the controller 130 may include a power source, such as a battery. Although shown as separate elements, the location unit 131, the electronic communication unit 132, the processor 133, the memory 134, the user interface 135, the sensor 136, the electronic communication interface 137, or any combination thereof may be integrated in one or more electronic units, circuits, or chips.

The processor 133 may include any device or combination of devices capable of manipulating or processing a signal or other information now-existing or hereafter developed, including optical processors, quantum processors, molecular processors, or a combination thereof. For example, the processor 133 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 133 may be operatively coupled with the location unit 131, the memory 134, the electronic communication interface 137, the electronic communication unit 132, the user interface 135, the sensor 136, the powertrain 120, or any combination thereof. For example, the processor may be operatively coupled with the memory 134 via a communication bus 138.

The memory 134 may include any tangible non-transitory computer-usable or computer-readable medium, capable of, for example, containing, storing, communicating, or transporting machine readable instructions, or any information associated therewith, for use by or in connection with the processor 133. The memory 134 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof.

The communication interface 137 may be a wireless antenna, as shown, a wired communication port, an optical communication port, or any other wired or wireless unit capable of interfacing with a wired or wireless electronic communication medium 150. Although FIG. 1 shows the communication interface 137 communicating via a single communication link, a communication interface may be configured to communicate via multiple communication links. Although FIG. 1 shows a single communication interface 137, a vehicle may include any number of communication interfaces.

The communication unit 132 may be configured to transmit or receive signals via a wired or wireless electronic communication medium 150, such as via the communication interface 137. Although not explicitly shown in FIG. 1, the communication unit 132 may be configured to transmit, receive, or both via any wired or wireless communication medium, such as radio frequency (RF), ultraviolet (UV), visible light, fiber optic, wireline, or a combination thereof. Although FIG. 1 shows a single communication unit 132 and a single communication interface 137, any number of communication units and any number of communication interfaces may be used. In some embodiments, the communication unit 132 may include a dedicated short-range communications (DSRC) unit, an on-board unit (OBU), or a combination thereof.

The location unit 131 may determine geolocation information, such as longitude, latitude, elevation, direction of travel, or speed, of the vehicle 100. For example, the location unit may include a GPS unit, such as a Wide Area Augmentation System (WAAS) enabled National Marine-Electronics Association (NMEA) unit, a radio triangulation unit, or a combination thereof. The location unit 131 can be used to obtain information that represents, for example, a current heading of the vehicle 100, a current position of the vehicle 100 in two or three dimensions, a current angular orientation of the vehicle 100, or a combination thereof.

The user interface 135 may include any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 135 may be operatively coupled with the processor 133, as shown, or with any other element of the controller 130. Although shown as a single unit, the user interface 135 may include one or more physical units. For example, the user interface 135 may include an audio interface for performing audio communication with a person and a touch display for performing visual and touch-based communication with the person. The user interface 135 may include multiple displays, such as multiple physically separate units, multiple defined portions within a single physical unit, or a combination thereof.

The sensor 136 may include one or more sensors, such as an array of sensors, which may be operable to provide information that may be used to control the vehicle. The sensors 136 may provide information regarding current operating characteristics of the vehicle 100. The sensor 136 can include, for example, a speed sensor, acceleration sensors, a steering angle sensor, traction-related sensors, braking-related sensors, steering wheel position sensors, eye tracking sensors, seating position sensors, or any sensor, or combination of sensors, operable to report information regarding some aspect of the current dynamic situation of the vehicle 100.

The sensor 136 may include one or more sensors operable to obtain information regarding the physical environment surrounding the vehicle 100. For example, one or more sensors may detect road geometry and features, such as lane lines, and obstacles, such as fixed obstacles, vehicles, and pedestrians. The sensor 136 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 136 and the location unit 131 may be a combined unit.

Although not shown separately, the vehicle 100 may include a trajectory controller. For example, the controller 130 may include the trajectory controller. The trajectory controller may be operable to obtain information describing a current state of the vehicle 100 and a route planned for the vehicle 100, and, based on this information, to determine and optimize a trajectory for the vehicle 100. In some embodiments, the trajectory controller may output signals operable to control the vehicle 100 such that the vehicle 100 follows the trajectory that is determined by the trajectory controller. For example, the output of the trajectory controller can be an optimized trajectory that may be supplied to the powertrain 120, the wheels 140, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 140 may be a steered wheel, which may be pivoted to a steering angle under control of the steering unit 123, a propelled wheel, which may be torqued to propel the vehicle 100 under control of the transmission 122, or a steered and propelled wheel that may steer and propel the vehicle 100.

A vehicle may include units, or elements, not expressly shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

The vehicle 100 may be an autonomous vehicle controlled autonomously, without direct human intervention, to traverse a portion of a vehicle transportation network. Although not shown separately in FIG. 1, an autonomous vehicle may include an autonomous vehicle control unit, which may perform autonomous vehicle routing, navigation, and control. The autonomous vehicle control unit may be integrated with another unit of the vehicle. For example, the controller 130 may include the autonomous vehicle control unit. The teachings herein are equally applicable to a semi-autonomous vehicle.

The autonomous vehicle control unit may control or operate the vehicle 100 to traverse a portion of the vehicle transportation network in accordance with current vehicle operation parameters. The autonomous vehicle control unit may control or operate the vehicle 100 to perform a defined operation or maneuver, such as parking the vehicle. The autonomous vehicle control unit may generate a route of travel from an origin, such as a current location of the vehicle 100, to a destination based on vehicle information, environment information, vehicle transportation network data representing the vehicle transportation network, or a combination thereof, and may control or operate the vehicle 100 to traverse the vehicle transportation network in accordance with the route. For example, the autonomous vehicle control unit may output the route of travel to the trajectory controller, and the trajectory controller may operate the vehicle 100 to travel from the origin to the destination using the generated route.

Figure 2:
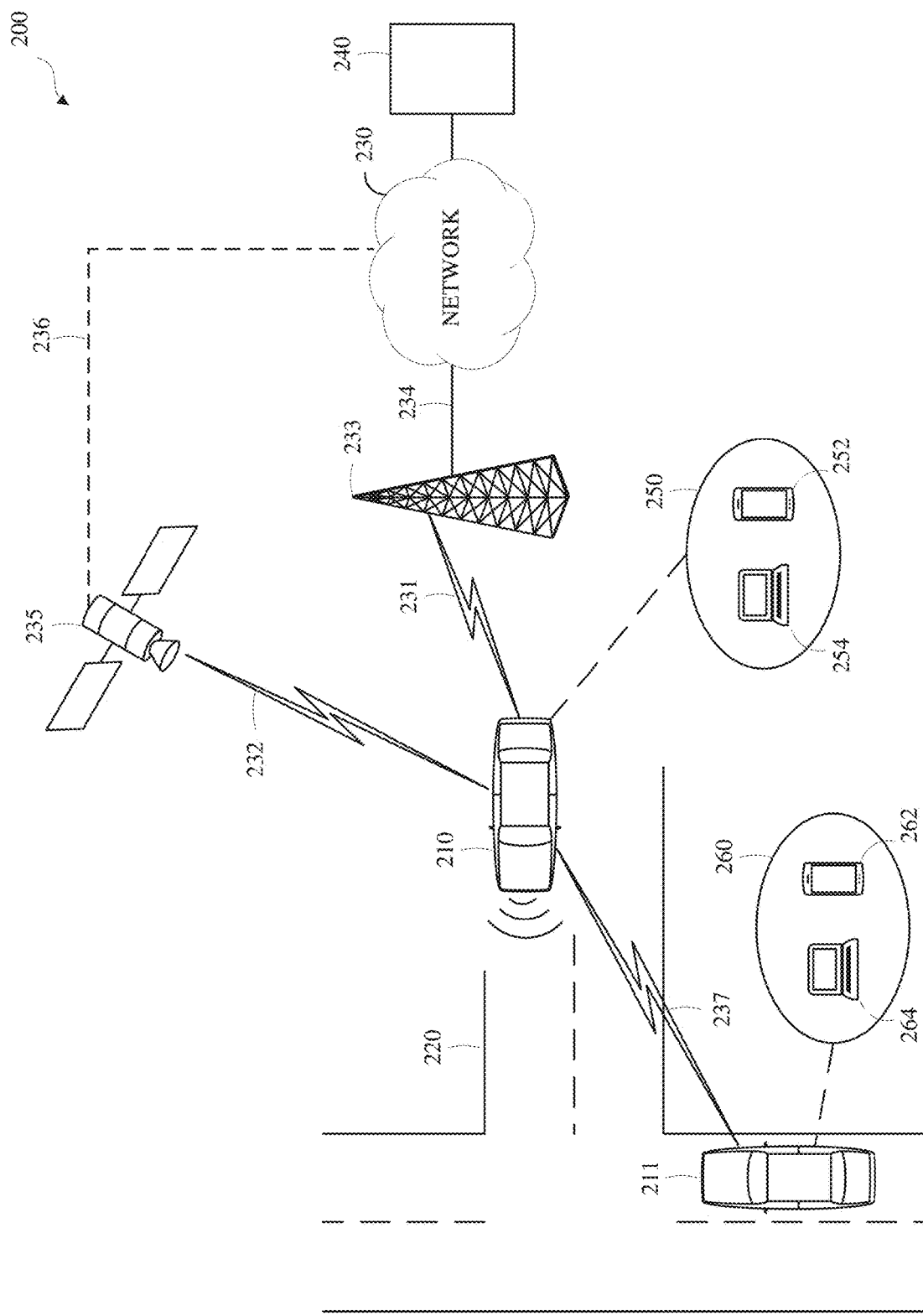
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 200 may include one or more vehicles 210/211, such as the vehicle 100 shown in FIG. 1, which may travel via one or more portions of one or more vehicle transportation networks 220, and the vehicle may communicate via one or more electronic communication networks 230. Although not explicitly shown in FIG. 2, a vehicle may traverse an area that is not expressly or completely included in a vehicle transportation network, such as an off-road area.

The electronic communication network 230 may be, for example, a multiple access system and may provide for communication, such as voice communication, data communication, video communication, messaging communication, or a combination thereof, between the vehicle 210/211 and one or more communication devices 240. For example, a vehicle 210/211 may receive information, such as information representing the vehicle transportation network 220, from a communication device 240 via the network 230.

In some embodiments, a vehicle 210/211 may communicate via a wired communication link (not shown), a wireless communication link 231/232/237, or a combination of any number of wired or wireless communication links. For example, as shown, a vehicle 210/211 may communicate via a terrestrial wireless communication link 231, via a non-terrestrial wireless communication link 232, or via a combination thereof. The terrestrial wireless communication link 231 may include an Ethernet link, a serial link, a Bluetooth link, an infrared (IR) link, a UV link, or any link capable of providing for electronic communication.

A vehicle 210/211 may communicate with another vehicle 210/2110. For example, a host, or subject, vehicle (HV) 210 may receive one or more automated inter-vehicle messages, such as a basic safety message (BSM), from a remote, or target, vehicle (RV) 211, via a direct communication link 237, or via a network 230. For example, the remote vehicle 211 may broadcast the message to host vehicles within a defined broadcast range, such as 300 meters. In some embodiments, the host vehicle 210 may receive a message via a third party, such as a signal repeater (not shown) or another remote vehicle (not shown). A vehicle 210/211 may transmit one or more automated inter-vehicle messages periodically, based on, for example, a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

The vehicle 210 may communicate with the communications network 230 via an access point 233. The access point 233, which may include a computing device, may be configured to communicate with a vehicle 210, with a communication network 230, with one or more communication devices 240, or with a combination thereof via wired or wireless communication links 231/234. For example, the access point 233 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit in FIG. 2, an access point may include any number of interconnected elements.

The vehicle 210 may communicate with the communications network 230 via a satellite 235 or other non-terrestrial communication device. The satellite 235, which may include a computing device, may be configured to communicate with a vehicle 210, with a communication network 230, with one or more communication devices 240, or with a combination thereof via one or more communication links 232/236. Although shown as a single unit in FIG. 2, a satellite may include any number of interconnected elements.

An electronic communication network 230 may be any type of network configured to provide for voice, data, or any other type of electronic communication. For example, the electronic communication network 230 may include a local area network (LAN), a wide area network (WAN), a virtual private network (VPN), a mobile or cellular telephone network, the Internet, or any other electronic communication system. The electronic communication network 230 may use a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit in FIG. 2, an electronic communication network may include any number of interconnected elements.

The vehicle 210 may identify a portion or condition of the vehicle transportation network 220. For example, the vehicle 210 may include one or more on-vehicle sensors, such as sensor 136 shown in FIG. 1, which may include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 220. The sensor data may include lane line data, remote vehicle location data, or both.

The vehicle 210 may traverse a portion or portions of one or more vehicle transportation networks 220 using information communicated via the network 230, such as information representing the vehicle transportation network 220, information identified by one or more on-vehicle sensors, or a combination thereof.

Although for simplicity FIG. 2 shows two vehicles 210, 211, one vehicle transportation network 220, one electronic communication network 230, and one communication device 240, any number of vehicles, networks, or computing devices may be used. The vehicle transportation and communication system 200 may include devices, units, or elements not shown in FIG. 2. Although the vehicle 210 is shown as a single unit, a vehicle may include any number of interconnected elements.

Although the vehicle 210 is shown communicating with the communication device 240 via the network 230, the vehicle 210 may communicate with the communication device 240 via any number of direct or indirect communication links. For example, the vehicle 210 may communicate with the communication device 240 via a direct communication link, such as a Bluetooth communication link.

In some embodiments, a vehicle 210/211 may be associated with an entity 250/260, such as a driver, operator, or owner of the vehicle. In some embodiments, an entity 250/260 associated with a vehicle 210/211 may be associated with one or more personal electronic devices 252/254/262/264, such as a smartphone 252/262 or a computer 254/264. In some embodiments, a personal electronic device 252/254/262/264 may communicate with a corresponding vehicle 210/211 via a direct or indirect communication link. Although one entity 250/260 is shown as associated with a respective vehicle 210/211 in FIG. 2, any number of vehicles may be associated with an entity and any number of entities may be associated with a vehicle.

The vehicle transportation network 220 shows only navigable areas (e.g., roads), but the vehicle transportation network may also include one or more unnavigable areas, such as a building, one or more partially navigable areas, such as a parking area or pedestrian walkway, or a combination thereof. The vehicle transportation network 220 may also include one or more interchanges between one or more navigable, or partially navigable, areas. A portion of the vehicle transportation network 220, such as a road, may include one or more lanes and may be associated with one or more directions of travel.

A vehicle transportation network, or a portion thereof, may be represented as vehicle transportation network data. For example, vehicle transportation network data may be expressed as a hierarchy of elements, such as markup language elements, which may be stored in a database or file. For simplicity, the figures herein depict vehicle transportation network data representing portions of a vehicle transportation network as diagrams or maps; however, vehicle transportation network data may be expressed in any computer-usable form capable of representing a vehicle transportation network, or a portion thereof. The vehicle transportation network data may include vehicle transportation network control information, such as direction of travel information, speed limit information, toll information, grade information, such as inclination or angle information, surface material information, aesthetic information, defined hazard information, or a combination thereof.

A portion, or a combination of portions, of the vehicle transportation network 220 may be identified as a point of interest or a destination. For example, the vehicle transportation network data may identify a building as a point of interest or destination. The point of interest or destination may be identified using a discrete uniquely identifiable geolocation. For example, the vehicle transportation network 220 may include a defined location, such as a street address, a postal address, a vehicle transportation network address, a GPS address, or a combination thereof for the destination.

Figure 3:
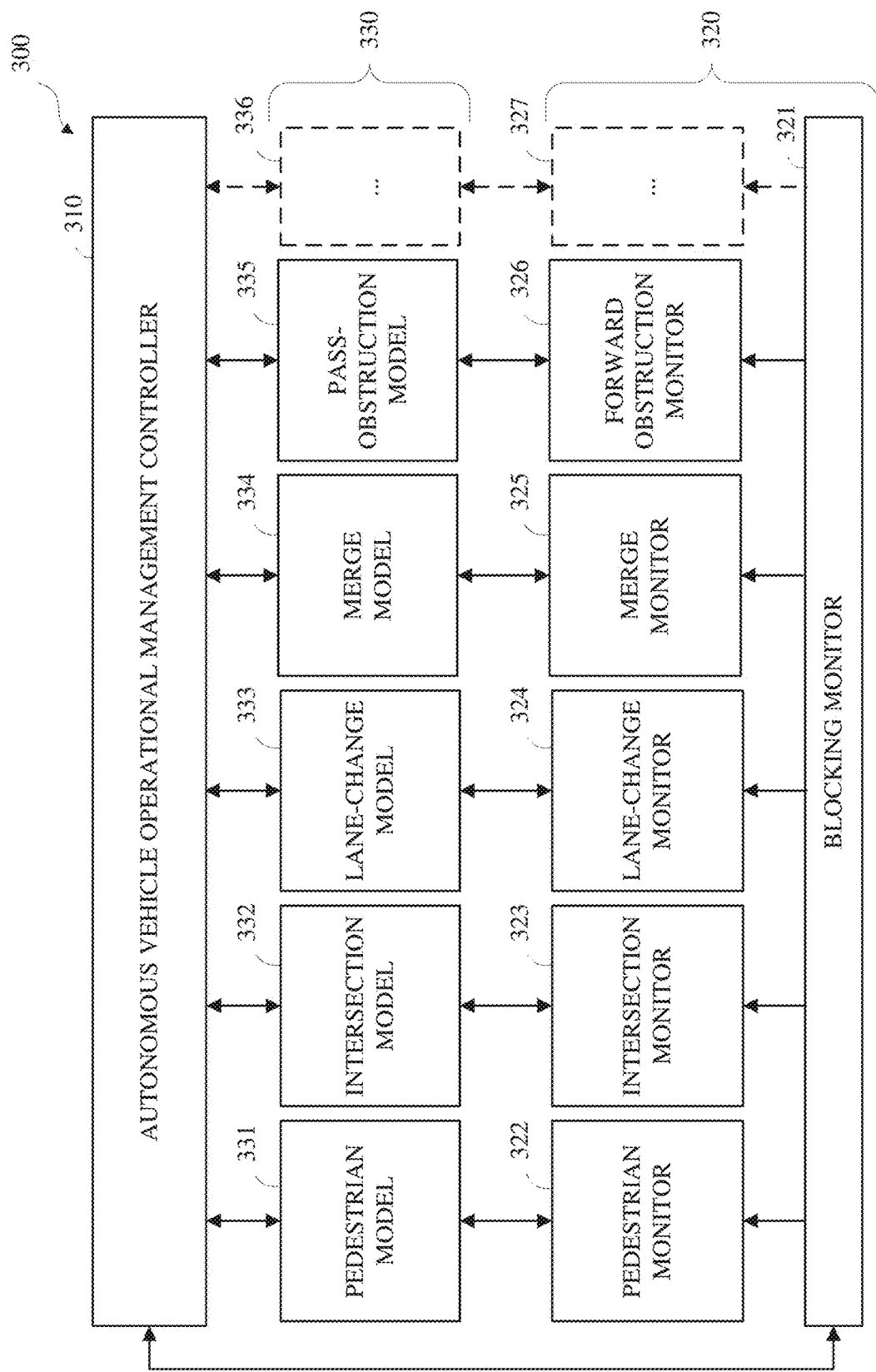
FIG. 3 is a diagram of an example of an autonomous vehicle operational management system in accordance with embodiments of this disclosure.

FIG. 3 is a diagram of an example of an autonomous vehicle operational management system 300 in accordance with embodiments of this disclosure. The autonomous vehicle operational management system 300 may be implemented in an autonomous vehicle, such as the vehicle 100 shown in FIG. 1, one of the vehicles 210/211 shown in FIG. 2, a semi-autonomous vehicle, or any other vehicle implementing autonomous decision-making, at least in part.

The autonomous vehicle may traverse a vehicle transportation network, or a portion thereof, which may include traversing distinct vehicle operation scenarios. A distinct vehicle operation scenario may include any distinctly identifiable set of operative conditions that may affect the operation of the autonomous vehicle within a defined spatiotemporal area, or operational environment, of the autonomous vehicle. For example, a distinct vehicle operation scenario may be based on a number or cardinality of roads, road segments, or lanes that the autonomous vehicle may traverse within a defined spatiotemporal distance. In another example, a distinct vehicle operation scenario may be based on one or more traffic control devices that may affect the operation of the autonomous vehicle within a defined spatiotemporal area, or operational environment, of the autonomous vehicle. In another example, a distinct vehicle operation scenario may be based on one or more identifiable rules, regulations, or laws that may affect the operation of the autonomous vehicle within a defined spatiotemporal area, or operational environment, of the autonomous vehicle. In another example, a distinct vehicle operation scenario may be based on one or more identifiable external objects that may affect the operation of the autonomous vehicle within a defined spatiotemporal area, or operational environment, of the autonomous vehicle.

As shown in FIG. 3, the autonomous vehicle operational management system 300 includes an autonomous vehicle operational management controller (AVOMC) 310, operational environment monitors 320, and operation control evaluation modules (also referred to as models) 330.

The AVOMC 310 may control the vehicle to traverse the vehicle transportation network, or a portion thereof. Controlling the vehicle to traverse the vehicle transportation network may include, in some implementations, monitoring the operational environment of the vehicle, identifying or detecting distinct vehicle operation scenarios, identifying candidate vehicle control actions based on the distinct vehicle operation scenarios, and controlling the vehicle to traverse a portion of the vehicle transportation network in accordance with one or more of the candidate vehicle control actions.

The AVOMC 310 may receive, identify, or otherwise access, operational environment data representing an operational environment for the autonomous vehicle, such as a current operational environment or an expected operational environment, or one or more aspects thereof. The operational environment of the autonomous vehicle may include a distinctly identifiable set of operative conditions that may affect the operation of the autonomous vehicle within a defined spatiotemporal area of the autonomous vehicle, within a defined spatiotemporal area of an identified route for the autonomous vehicle, or a combination thereof. For example, operative conditions that may affect the operation of the autonomous vehicle may be identified based on sensor data, vehicle transportation network data, route data, or any other data or combination of data representing a defined or determined operational environment for the vehicle.

The operational environment data may include vehicle information for the autonomous vehicle, such as information indicating a geospatial location of the autonomous vehicle, information correlating the geospatial location of the autonomous vehicle to information representing the vehicle transportation network, a route of the autonomous vehicle, a speed of the autonomous vehicle, an acceleration state of the autonomous vehicle, passenger information of the autonomous vehicle, or any other information about the autonomous vehicle or the operation of the autonomous vehicle. The operational environment data may include information representing the vehicle transportation network proximate to the autonomous vehicle, an identified route for the autonomous vehicle, or both. For example, this may include information within a defined spatial distance, such as 300 meters, of portions of the vehicle transportation network along the identified route, information indicating the geometry of one or more aspects of the vehicle transportation network, information indicating a condition, such as a surface condition, of the vehicle transportation network, or any combination thereof.

The operational environment data may include information representing external objects within the operational environment of the autonomous vehicle, such as information representing pedestrians, non-human animals, non-motorized transportation devices, such as bicycles or skateboards, motorized transportation devices, such as remote vehicles, or any other external object or entity that may affect the operation of the autonomous vehicle.

Aspects of the operational environment of the autonomous vehicle may be represented within respective distinct vehicle operation scenarios. For example, the relative orientation, trajectory, expected path, of external objects may be represented within respective distinct vehicle operation scenarios. In another example, the relative geometry of the vehicle transportation network may be represented within respective distinct vehicle operation scenarios.

The autonomous vehicle may traverse multiple distinct vehicle operation scenarios within an operational environment, which may be aspects of a compound vehicle operational scenario. For example, a pedestrian may approach the expected path for the autonomous vehicle traversing an intersection.

The autonomous vehicle operational management system 300 may operate or control the autonomous vehicle to traverse the distinct vehicle operation scenarios subject to defined constraints, such as safety constraints, legal constraints, physical constraints, user acceptability constraints, or any other constraint or combination of constraints that may be defined or derived for the operation of the autonomous vehicle.

The AVOMC 310 may monitor the operational environment of the autonomous vehicle, or defined aspects thereof. Monitoring the operational environment of the autonomous vehicle may include identifying and tracking external objects, identifying distinct vehicle operation scenarios, or a combination thereof. For example, the AVOMC 310 may identify and track external objects within the operational environment of the autonomous vehicle. Identifying and tracking the external objects may include identifying spatiotemporal locations of respective external objects, which may be relative to the autonomous vehicle, identifying one or more expected paths for respective external objects, which may include identifying a speed, a trajectory, or both, for an external object. For simplicity and clarity, descriptions of locations, expected locations, paths, expected paths, and the like herein may omit express indications that the corresponding locations and paths refer to geospatial and temporal components; however, unless expressly indicated herein, or otherwise unambiguously clear from context, the locations, expected locations, paths, expected paths, and the like described herein may include geospatial components, temporal components, or both. Monitoring the operational environment of the autonomous vehicle may include using operational environment data received by the operational environment monitors 320.

The operational environment monitors 320 may include scenario-agnostic monitors, scenario-specific monitors, or a combination thereof. A scenario-agnostic monitor, such as a blocking monitor 321, may monitor the operational environment of the autonomous vehicle, generate operational environment information representing aspects of the operational environment of the autonomous vehicle, and output the operational environment information to one or more scenario-specific monitors, the AVOMC 310, or a combination thereof, as discussed in further detail below. A scenario-specific monitor, such as a pedestrian monitor 322, an intersection monitor 323, a lane-change monitor 324, a merge monitor 325, or a forward obstruction monitor 326, may monitor the operational environment of the autonomous vehicle, generate operational environment information representing scenario-specific aspects of the operational environment of the autonomous vehicle, and output the operational environment information to one or more operation control evaluation models 330, the AVOMC 310, or a combination thereof.

For example, the pedestrian monitor 322 may be an operational environment monitor for monitoring pedestrians, the intersection monitor 323 may be an operational environment monitor for monitoring intersections, the lane-change monitor 324 may be an operational environment monitor for monitoring lane-changes, the merge monitor 325 may be an operational environment monitor for merges, and the forward obstruction monitor 326 may be an operational environment monitor for monitoring forward obstructions. An operational environment monitor 327 is shown using broken lines to indicate that the autonomous vehicle operational management system 300 may include any number of operational environment monitors 320.

An operational environment monitor 320 may receive, or otherwise access, operational environment data, such as operational environment data generated or captured by one or more sensors of the autonomous vehicle, vehicle transportation network data, vehicle transportation network geometry data, route data, or a combination thereof. For example, the pedestrian monitor 322 may receive, or otherwise access, information, such as sensor data, which may indicate, correspond to, or may otherwise be associated with, one or more pedestrians in the operational environment of the autonomous vehicle. An operational environment monitor 320 may associate the operational environment data, or a portion thereof, with the operational environment, or an aspect thereof, such as with an external object, such as a pedestrian, a remote vehicle, or an aspect of the vehicle transportation network geometry.

An operational environment monitor 320 may generate, or otherwise identify, information representing one or more aspects of the operational environment, such as with an external object, such as a pedestrian, a remote vehicle, or an aspect of the vehicle transportation network geometry, which may include filtering, abstracting, or otherwise processing the operational environment data. An operational environment monitor 320 may output the information representing the one or more aspects of the operational environment to, or for access by, the AVOMC 310, such by storing the information representing the one or more aspects of the operational environment in a memory, such as the memory 134 shown in FIG. 1, of the autonomous vehicle accessible by the AVOMC 310, sending the information representing the one or more aspects of the operational environment to the AVOMC 310, or a combination thereof. An operational environment monitor 320 may output the operational environment information to one or more elements of the autonomous vehicle operational management system 300, such as the AVOMC 310. Although not shown in FIG. 3, a scenario-specific operational environment monitor 322, 323, 324, 325, 326 may output operational environment data or the derived operational environment information to a scenario-agnostic operational environment monitor, such as the blocking monitor 321.

The pedestrian monitor 322 may correlate, associate, or otherwise process the operational environment data to identify, track, or predict actions of one or more pedestrians. For example, the pedestrian monitor 322 may receive information, such as sensor data, from one or more sensors, which may correspond to one or more pedestrians, the pedestrian monitor 322 may associate the sensor data with one or more identified pedestrians, which may include may identifying a direction of travel, a path, such as an expected path, a current or expected velocity, a current or expected acceleration rate, or a combination thereof for one or more of the respective identified pedestrians, and the pedestrian monitor 322 may output the identified, associated, or generated pedestrian information to, or for access by, the AVOMC 310.

The intersection monitor 323 may correlate, associate, or otherwise process the operational environment data to identify, track, or predict actions of one or more remote vehicles in the operational environment of the autonomous vehicle, to identify an intersection, or an aspect thereof, in the operational environment of the autonomous vehicle, to identify vehicle transportation network geometry, or a combination thereof. For example, the intersection monitor 323 may receive information, such as sensor data, from one or more sensors, which may correspond to one or more remote vehicles in the operational environment of the autonomous vehicle, the intersection, or one or more aspects thereof, in the operational environment of the autonomous vehicle, the vehicle transportation network geometry, or a combination thereof, the intersection monitor 323 may associate the sensor data with one or more identified remote vehicles in the operational environment of the autonomous vehicle, the intersection, or one or more aspects thereof, in the operational environment of the autonomous vehicle, the vehicle transportation network geometry, or a combination thereof, which may include may identifying a current or expected direction of travel, a path, such as an expected path, a current or expected velocity, a current or expected acceleration rate, or a combination thereof for one or more of the respective identified remote vehicles. The intersection monitor 323 may output the identified, associated, or generated intersection information to, or for access by, the AVOMC 310.

The lane-change monitor 324 may correlate, associate, or otherwise process the operational environment data to identify, track, or predict actions of one or more remote vehicles in the operational environment of the autonomous vehicle, such as information indicating a slow or stationary remote vehicle along the expected path of the autonomous vehicle, to identify one or more aspects of the operational environment of the autonomous vehicle, such as vehicle transportation network geometry in the operational environment of the autonomous vehicle, or a combination thereof geospatially corresponding to a lane-change operation. For example, the lane-change monitor 324 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a lane-change operation, the lane-change monitor 324 may associate the sensor data with one or more identified remote vehicles in the operational environment of the autonomous vehicle, one or more aspects of the operational environment of the autonomous vehicle or a combination thereof geospatially corresponding to a lane-change operation, which may include may identifying a current or expected direction of travel, a path, such as an expected path, a current or expected velocity, a current or expected acceleration rate, or a combination thereof for one or more of the respective identified remote vehicles. The lane-change monitor 324 may output the identified, associated, or generated lane-change information to, or for access by, the AVOMC 310

The merge monitor 325 may correlate, associate, or otherwise process the operational environment information to identify, track, or predict actions of one or more remote vehicles in the operational environment of the autonomous vehicle, to identify one or more aspects of the operational environment of the autonomous vehicle, such as vehicle transportation network geometry in the operational environment of the autonomous vehicle, or a combination thereof geospatially corresponding to a merge operation. For example, the merge monitor 325 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a merge operation, the merge monitor 325 may associate the sensor data with one or more identified remote vehicles in the operational environment of the autonomous vehicle, one or more aspects of the operational environment of the autonomous vehicle or a combination thereof geospatially corresponding to a merge operation, which may include identifying a current or expected direction of travel, a path, such as an expected path, a current or expected velocity, a current or expected acceleration rate, or a combination thereof for one or more of the respective identified remote vehicles. The merge monitor 325 may output the identified, associated, or generated merge information to, or for access by, the AVOMC 310.

The forward obstruction monitor 326 may correlate, associate, or otherwise process the operational environment information to identify one or more aspects of the operational environment of the autonomous vehicle geospatially corresponding to a forward pass-obstruction operation. For example, the forward obstruction monitor 326 may identify vehicle transportation network geometry in the operational environment of the autonomous vehicle. The forward obstruction monitor 326 may identify one or more obstructions or obstacles in the operational environment of the autonomous vehicle, such as a slow or stationary remote vehicle along the expected path of the autonomous vehicle or along an identified route for the autonomous vehicle; and the forward obstruction monitor 326 may identify, track, or predict actions of one or more remote vehicles in the operational environment of the autonomous vehicle. The forward obstruction monitor 326 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a forward pass-obstruction operation. The forward obstruction monitor 326 may associate the sensor data with one or more identified remote vehicles in the operational environment of the autonomous vehicle, one or more aspects of the operational environment of the autonomous vehicle or a combination thereof geospatially corresponding to the forward pass-obstruction operation, which may include may identifying a current or expected direction of travel, a path, such as an expected path, a current or expected velocity, a current or expected acceleration rate, or a combination thereof for one or more of the respective identified remote vehicles. The forward obstruction monitor 326 may output the identified, associated, or generated forward obstruction information to, or for access by, the AVOMC 310.

While shown as an operation environment monitor 320, the blocking monitor 321 may be a separate monitoring device. The blocking monitor 321 may receive operational environment data representing an operational environment, or an aspect thereof, for the vehicle. For example, the blocking monitor 321 may receive the operational environment data from the AVOMC 310, from a sensor of the vehicle, from an external device, such as a remote vehicle or an infrastructure device, or a combination thereof. The blocking monitor 321 may read the operational environment data, or a portion thereof, from a memory, such as a memory of the autonomous vehicle, such as the memory 134 shown in FIG. 1.

The blocking monitor 321, using this input, may determine a respective probability of availability (POA), or corresponding blocking probability, for one or more portions of the vehicle transportation network, such as portions of the vehicle transportation network proximal to the autonomous vehicle, which may include portions of the vehicle transportation network corresponding to an expected path of the autonomous vehicle, such as an expected path identified based on a current route of the autonomous vehicle. A probability of availability, or corresponding blocking probability, may indicate a probability or likelihood that the autonomous vehicle may traverse a portion of, or spatial location within, the vehicle transportation network safely, such as unimpeded by an external object, such as a remote vehicle or a pedestrian. For example, a portion of the vehicle transportation network may include an obstruction, such as a stationary object, and a probability of availability for the portion of the vehicle transportation network may be low, such as 0%, which may be expressed as a high blocking probability, such as 100%, for the portion of the vehicle transportation network. The blocking monitor 321 may identify a respective probability of availability for each of multiple portions of the vehicle transportation network within an operational environment, such as within 300 meters, of the autonomous vehicle. The blocking monitor 321 may determine, or update, probabilities of availability continually or periodically. The blocking monitor 321 may communicate probabilities of availability, or corresponding blocking probabilities, to the AVOMC 310.

A probability of availability may be indicated by the blocking monitor 321 corresponding to each external object in the operational environment of the autonomous vehicle and a geospatial area may be associated with multiple probabilities of availability corresponding to multiple external objects. An aggregate probability of availability may be indicated by the blocking monitor 321 corresponding to each type of external object in the operational environment of the autonomous vehicle, such as a probability of availability for pedestrians and a probability of availability for remote vehicles, and a geo spatial area may be associated with multiple probabilities of availability corresponding to multiple external object types.

The blocking monitor 321 may identify external objects, track external objects, project location information, path information, or both for external objects, or a combination thereof. For example, the blocking monitor 321 may identify an external object and identify an expected path for the external object based on operational environment information (e.g., a current location of the external object), information indicating a current trajectory and/or speed for the external object, information indicating a type of classification of the external object (e.g., a pedestrian or a remote vehicle), vehicle transportation network information (e.g., a crosswalk proximate to the external object), previously identified or tracked information associated with the external object, or any combination thereof. The expected path may indicate a sequence of expected spatial locations, expected temporal locations, and corresponding probabilities.

The blocking monitor 321 may communicate probabilities of availability, or corresponding blocking probabilities, to the AVOMC 310. The AVOMC 310 may communicate the probabilities of availability, or corresponding blocking probabilities, to respective instantiated instances of the operational control evaluation models 330.

The AVOMC 310 may identify one or more distinct vehicle operation scenarios based on one or more aspects of the operational environment represented by the operational environment information. For example, the AVOMC 310 may identify a distinct vehicle operation scenario in response to identifying, or based on, the operational environment information indicated by one or more of the operational environment monitors 320. The distinct vehicle operation scenario may be identified based on route data, sensor data, or a combination thereof. For example, the AVOMC 310 may identify one or multiple distinct vehicle operation scenarios corresponding to an identified route for the vehicle, such as based on map data corresponding to the identified route, in response to identifying the route. Multiple distinct vehicle operation scenarios may be identified based on one or more aspects of the operational environment represented by the operational environment information. For example, the operational environment information may include information representing a pedestrian approaching an intersection along an expected path for the autonomous vehicle, and the AVOMC 310 may identify a pedestrian vehicle operational scenario, an intersection vehicle operational scenario, or both.

The AVOMC 310 may instantiate respective instances of one or more of the operation control evaluation models 330 based on one or more aspects of the operational environment represented by the operational environment information, such as the identification of an upcoming scenario. An upcoming scenario may be a distinct vehicle operation scenario that the AVOMC 310 determines that the autonomous vehicle is likely to encounter if it continues in its path. Upcoming scenarios may be expected (e.g., can be determined from the route of the autonomous vehicle) or unexpected. An unexpected upcoming scenario may be a scenario that can be detected by the sensors of the vehicle and cannot be determined without sensor data.

The operation control evaluation models 330 may include scenario-specific operation control evaluation model (SSO-CEMs), such as a pedestrian-SSOCEM 331, an intersection-SSOCEM 332, a lane-change-SSOCEM 333, a merge-SSOCEM 334, a pass-obstruction-SSOCEM 335, or a combination thereof. A SSOCEM 336 is shown using broken lines to indicate that the autonomous vehicle operational management system 300 may include any number of SSOCEMs 330. For example, the AVOMC 310 may instantiate an instance of a SSOCEM 330 in response to identifying a distinct vehicle operation scenario. The AVOMC 310 may instantiate multiple instances of one or more SSOCEMs 330 based on one or more aspects of the operational environment represented by the operational environment data. For example, the operational environment data may indicate two pedestrians in the operational environment of the autonomous vehicle and the AVOMC 310 may instantiate a respective instance of the pedestrian-SSOCEM 331 for each pedestrian.

The AVOMC 310 may send the operational environment information, or one or more aspects thereof, to another unit of the autonomous vehicle, such as the blocking monitor 321 or one or more instances of the SSOCEMs 330. For example, the AVOMC 310 may communicate the probabilities of availability, or corresponding blocking probabilities, received from the blocking monitor 321 to respective instantiated instances of the SSOCEMs 330. The AVOMC 310 may store the operational environment information, or one or more aspects thereof, such as in a memory, such as the memory 134 shown in FIG. 1, of the autonomous vehicle.

Although not expressly shown in FIG. 3, the autonomous vehicle operational management system 300 may include a predictor module that may generate and send prediction information to the blocking monitor 321, and the blocking monitor 321 may output probability of availability information to one or more of the other operational environment monitors 320.

A SSOCEM 330, once instantiated, can receive the operational environment information, which may include sensor data, to determine and output a candidate vehicle control action, also called a candidate action herein. A candidate action is a vehicle control action that is identified by the particular SSOCEM 330 as the likely optimal action for the vehicle to perform that will handle a particular scenario. For instance, a SSOCEM 330 configured to handle intersections (e.g., an intersection SSOCEM-332) may output a "proceed", a candidate action that suggests proceeding through an intersection. At the same time, a SSOCEM 330 for handling lane changes (e.g., the lane change SSOCEM 333) may output a "turn left" candidate action indicating that the vehicle should merge left by two degrees. In some implementations, each SSOCEM 330 outputs a confidence score indicating a degree of confidence in the candidate action determined by the SSOCEM 330. For instance, a confidence score greater than 0.95 may indicate a very high confidence in the candidate action, while a confidence score less than 0.5 may indicate a relatively low degree of confidence in the candidate action. Further details of a SSOCEM 330 are described below.

The AVOMC 310 may receive one or more candidate actions from respective instances of the SSOCEMs 330. The AVOMC 310 may identify a vehicle control action from the candidate vehicle control actions, and may control the vehicle, or may provide the identified vehicle control action to another vehicle control unit, to traverse the vehicle transportation network in accordance with the vehicle control action.

A vehicle control action may indicate a vehicle control operation or maneuver, such as accelerating, decelerating, turning, stopping, or any other vehicle operation or combination of vehicle operations that may be performed by the autonomous vehicle in conjunction with traversing a portion of the vehicle transportation network. For example, an 'advance' vehicle control action may include slowly inching forward a short distance, such as a few inches or a foot; an 'accelerate' vehicle control action may include accelerating a defined acceleration rate, or at an acceleration rate within a defined range; a 'decelerate' vehicle control action may include decelerating a defined deceleration rate, or at a deceleration rate within a defined range; a 'maintain' vehicle control action may include maintaining current operational parameters, such as by maintaining a current velocity, a current path or route, or a current lane orientation; and a 'proceed' vehicle control action may include beginning or resuming a previously identified set of operational parameters. Although some vehicle control actions are described herein, other vehicle control actions may be used.

A vehicle control action may include one or more performance metrics. For example, a 'stop' vehicle control action may include a deceleration rate as a performance metric. In another example, a 'proceed' vehicle control action may expressly indicate route or path information, speed information, an acceleration rate, or a combination thereof as performance metrics, or may expressly or implicitly indicate that a current or previously identified path, speed, acceleration rate, or a combination thereof may be maintained.

A vehicle control action may be a compound vehicle control action, which may include a sequence, combination, or both of vehicle control actions. For example, an 'advance' vehicle control action may indicate a 'stop' vehicle control action, a subsequent 'accelerate' vehicle control action associated with a defined acceleration rate, and a subsequent 'stop' vehicle control action associated with a defined deceleration rate, such that controlling the autonomous vehicle in accordance with the 'advance' vehicle control action includes controlling the autonomous vehicle to slowly inch forward a short distance, such as a few inches or a foot.

In some implementations, the AVOMC 310 utilizes hardcoded logic to determine the vehicle control action from the candidate actions. For example, the AVOMC 310 may select the candidate action having the highest confidence score. In other implementations, the AVOMC 310 may select the candidate action that is the least likely to result in a collision. In other implementations, the AVOMC 310 may generate a compound action based on two or more non-conflicting candidate actions (e.g., compounding 'proceed' and 'turn left by two degrees' to result in a vehicle control action that causes the vehicle to veer left and proceed through an intersection). In some implementations, the AVOMC 310 may utilize a machine learning algorithm to determine a vehicle control action based on two or more differing candidate actions.

For example, identifying the vehicle control action from the candidate actions may include implementing a machine learning component, such as supervised learning of a classification problem, and training the machine learning component using examples, such as 1000 examples, of the corresponding vehicle operational scenario. In another example, identifying the vehicle control action from the candidate actions may include implementing a Markov Decision Process (MDP), or a Partially Observable Markov Decision Process (POMDP), which may describe how respective candidate actions affect subsequent candidate actions, and may include a reward function that outputs a positive or negative reward for respective vehicle control actions.

The AVOMC 310 may uninstantiate an instance of a SSOCEM 330. For example, the AVOMC 310 may identify a distinct set of operative conditions as indicating a distinct vehicle operation scenario for the autonomous vehicle, instantiate an instance of a SSOCEM 330 for the distinct vehicle operation scenario, monitor the operative conditions, subsequently determine that one or more of the operative conditions has expired, or has a probability of affecting the operation of the autonomous vehicle below a defined threshold, and the AVOMC 310 may uninstantiate the instance of the SSOCEM 330.

As referred to briefly above, a SSOCEM 330 may model a respective distinct vehicle operation scenario. The autonomous vehicle operational management system 300 includes any number of SSOCEMs 330, each modeling a respective distinct vehicle operation scenario. Modeling a distinct vehicle operation scenario may include generating and/or maintaining state information representing aspects of an operational environment of the vehicle corresponding to the distinct vehicle operation scenario, identifying potential interactions among the modeled aspects respective of the corresponding states, and determining a candidate action that solves the model. Stated more simply, a SSOCEM 330 may include one or more models that are configured to determine one or more vehicle control actions for handling a scenario given a set of inputs. The models may include, but are not limited to, POMDP models, MDP models, Classical Planning (CP) models, Partially Observable Stochastic Game (POSG) models, Decentralized Partially Observable Markov Decision Process (Dec-POMDP) models, Reinforcement Learning (RL) models, artificial neural networks, hardcoded expert logic, or any other suitable types of models. Examples of different types of models are provided below. Each SSOCEM 330 includes computer-executable instructions that define a manner by which the models, e.g., decision process models, operate and a manner by which the models are utilized.

A SSOCEM 330 may implement a discrete time stochastic control process, such as a POMDP model, which may be a single-agent model that models a distinct vehicle operation scenario, which may include modeling uncertainty, using a set of states (S), a set of actions (A), a set of observations ($\Omega$), a set of state transition probabilities (T), a set of conditional observation probabilities (O), a reward function (R), or a combination thereof. A POMDP model may be defined or described as a tuple <S, A, $\Omega$, T, O, R>.

A state from the set of states (S), may represent a distinct condition of respective defined aspects, such as external objects and traffic control devices, of the operational environment of the autonomous vehicle that may probabilistically affect the operation of the autonomous vehicle at a discrete temporal location. A respective set of states (S) may be defined for each distinct vehicle operation scenario. Each state (state space) from a set of states (S) may include one or more defined state factors. Although some examples of state factors for some models are described herein, a model, including any model described herein, may include any number, or cardinality, of state factors. Each state factor may represent a defined aspect of the respective scenario and may have a respective defined set of values. Although some examples of state factor values for some state factors are described herein, a state factor, including any state factor described herein, may include any number, or cardinality, of values.

For example, a remote or external object operating in the proximity of the vehicle may affect the operation of the vehicle and may be represented in a model. The model may include representing the following identified or expected information for the remote object, such as a remote vehicle: its geospatial location, its path, heading, or both, its velocity, its acceleration or deceleration rate, or a combination thereof corresponding to a respective temporal location. A respective set of states may be defined for each distinct vehicle operation scenario. At instantiation, the current state of the model may correspond to a contemporaneous state or condition of the operating environment.

An action from the set of actions (A) may indicate an available vehicle control action at each state in the set of states (S). A respective set of actions may be defined for each distinct vehicle operation scenario. Each action (action space) from a set of actions (A) may include one or more defined action factors. Although some examples of action factors for some models are described herein, a model, including any model described herein, may include any number, or cardinality, of action factors. Each action factor may represent an available vehicle control action and may have a respective defined set of values. Although some examples of action factor values for some action factors are described herein, an action factor, including any action factor described herein, may include any number, or cardinality, of values.

An observation from the set of observations ($\Omega$) may indicate available observable, measurable, or determinable data for each state from the set of states (S). A respective set of observations may be defined for each distinct vehicle operation scenario. Each observation (observation space), from a set of observations ($\Omega$) may include one or more defined observation factors. Although some examples of observation factors for some models are described herein, a model, including any model described herein, may include any number, or cardinality, of observation factors. Each observation factor may represent available observations and may have a respective defined set of values. Although some examples of observation factor values for some observation factors are described herein, an observation factor, including any observation factor described herein, may include any number, or cardinality, of values.

A state transition probability from the set of state transition probabilities (T) may probabilistically represent changes to the operational environment of the autonomous vehicle, as represented by the set of states (S), responsive to the actions of the autonomous vehicle, as represented by the set of actions (A), which may be expressed as T: $S \times A \times S \rightarrow [0, 1]$. A respective set of state transition probabilities (T) may be defined for each distinct vehicle operation scenario. Although some examples of state transition probabilities for some models are described herein, a model, including any model described herein, may include any number, or cardinality, of state transition probabilities. For example, each combination of a state, an action, and a subsequent state may be associated with a respective state transition probability.

The set of state transition probabilities may be identified based on the operational environment data. For example, the operational environment data may indicate an area type, such as urban or rural, a time of day, an ambient light level, weather conditions, traffic conditions, which may include expected traffic conditions, such as rush hour conditions, event-related traffic congestion, or holiday related driver behavior conditions, road conditions, jurisdictional conditions, such as country, state, or municipality conditions, or any other condition or combination of conditions that may affect the operation of the vehicle.

Examples of state transition probabilities associated with a pedestrian vehicle operational scenario may include a defined probability of a pedestrian jaywalking (e.g., based on a geospatial distance between the pedestrian and the respective road segment); a defined probability of a pedestrian stopping in an intersection; a defined probability of a pedestrian crossing at a crosswalk; a defined probability of a pedestrian yielding to the vehicle at a crosswalk; any other probability associated with a pedestrian vehicle operational scenario.

Examples of state transition probabilities associated with an intersection vehicle operational scenario may include a defined probability of a remote vehicle arriving at an intersection; a defined probability of a remote vehicle cutting-off the autonomous vehicle; a defined probability of a remote vehicle traversing an intersection immediately subsequent to, and in close proximity to, a second remote vehicle traversing the intersection, such as in the absence of a right-of-way (piggybacking); a defined probability of a remote vehicle stopping, adjacent to the intersection, in accordance with a traffic control device, regulation, or other indication of right-of-way, prior to traversing the intersection; a defined probability of a remote vehicle traversing the intersection; a defined probability of a remote vehicle diverging from an expected path proximal to the intersection; a defined probability of a remote vehicle diverging from an expected right-of-way priority; or any other probability associated with an intersection vehicle operational scenario.

Examples of state transition probabilities associated with a lane change vehicle operational scenario may include a defined probability of a remote vehicle changing velocity, such as a defined probability of a remote vehicle behind the vehicle increasing velocity or a defined probability of a remote vehicle in front of the vehicle decreasing velocity; a defined probability of a remote vehicle in front of the vehicle changing lanes; a defined probability of a remote vehicle proximate to the vehicle changing speed to allow the vehicle to merge into a lane; or any other probabilities associated with a lane change vehicle operational scenario.

A conditional observation probability from the set of conditional observation probabilities (O) may represent probabilities of making respective observations ($\Omega$) based on the operational environment of the vehicle, as represented by the set of states (S), responsive to the actions of the vehicle, as represented by the set of actions (A), which may be represented as O: $A \times S \times \Omega \rightarrow [0, 1]$. A respective set of conditional observation probabilities (O) may be defined for each distinct vehicle operation scenario. Although some examples of state conditional observation probabilities for some models are described herein, a model, including any model described herein, may include any number, or cardinality, of conditional observation probabilities. For example, each combination of an action, a subsequent state, and an observation may be associated with a respective conditional observation probability.

An example may be illustrated with reference to an intersection that the vehicle is approaching by traversing a first road. Contemporaneously, a remote vehicle may approach the intersection by traversing a second road. The vehicle may identify and evaluate operational environment data, such as sensor data, corresponding to the intersection, which may include operational environment data corresponding to the remote vehicle. The operational environment data may be inaccurate, incomplete, or erroneous. The vehicle may identify information probabilistically identifying the remote vehicle, such as probabilistically identifying location information for the remote vehicle. The conditional observation probability corresponding to observing, or probabilistically identifying, the location of the remote vehicle represents the probability that the identified operational environment information accurately represents the location of the remote vehicle. A model, including any model described herein, may include any number, or cardinality, of conditional observation probabilities. For example, each combination of an action, a subsequent state, and an observation may be associated with a respective conditional observation probability.

The reward function (R) may determine a respective positive or negative (cost) value that may be accrued for each combination of state and action, which may represent an expected value of the autonomous vehicle traversing the vehicle transportation network from the corresponding state in accordance with the corresponding vehicle control action to the subsequent state, which may be expressed as R: $S \times A \to \mathbb{R}$.

Solving a model may include determining a policy or solution, which may be a function, that maximizes the accrued reward, which may be determined by evaluating the possible combinations of the elements of the tuple, such as <S, A, Ω, T, O, R>, that defines the model. A policy or solution may identify or output a reward maximized, or optimal, candidate vehicle control action based on identified belief state data. The identified belief state data, which may be probabilistic, may indicate current state data, such as a current set of state values for the respective model, or a probability for the current set of state values, and may correspond with a respective relative temporal location. For example, solving a MDP model may include identifying a state from the set of states, identifying an action from the set of actions, determining a subsequent, or successor, state from the set of states subsequent to simulating the action subject to the state transition probabilities. Each state may be associated with a corresponding utility value, and solving the MDP model may include determining respective utility values corresponding to each possible combination of state, action, and subsequent state. The utility value of the subsequent state may be identified as the maximum identified utility value subject to a reward or penalty, which may be a discounted reward or penalty. The policy may indicate an action corresponding to the maximum utility value for a respective state. Solving a POMDP model is similar to solving the MDP model, except based probabilities for respective states and subject to observation probabilities corresponding generating observations for respective states. Where a probability is associated with a state within a POMDP model and other models that do not rely on discrete states, the states may be referred to as belief states. Thus, solving the SSOCEM model may include evaluating the possible state-action-state transitions and updating respective belief states, such as using Bayes' rule, particle filters, etc., based on respective actions and observations.

The autonomous vehicle operational management system 300 may include any number or combination of types of models. For example, the pedestrian-SSOCEM 331, the intersection-SSOCEM 332, the lane-change-SSOCEM 333, the merge-SSOCEM 334, and the pass-obstruction-SSOCEM 335 may be POMDP models. In another example, the pedestrian-SSOCEM 331 may be an MDP model and the intersection-SSOCEM 332 may be a POMDP model. The AVOMC 310 may instantiate any number of instances of the SSOCEMs 330 based on the operational environment data. A model 336 is shown using broken lines to indicate that the autonomous vehicle operational management system 300 may include any number or additional types of SSOCEMs 330. Although not expressly shown, in some embodiments an operational environment monitor 320 may identify occlusions, may identify or determine a probability that an external object is occluded, or hidden, by an identified occlusion, and may include occluded vehicle probability information in one or more SSOCEMs 330.

One or more of the AVOMC 310, the operational environment monitors 320, or the SSOCEMs 330 may operate continuously or periodically, such as at a frequency of ten hertz (10 Hz). For example, the AVOMC 310 may identify a vehicle control action many times, such as ten times, per second. The operational frequency of each component of the autonomous vehicle operational management system 300 may be synchronized or unsynchronized, and the operational rate of one or more of the AVOMC 310, the operational environment monitors 320, or the SSOCEMs 330 may be independent of the operational rate of others.

As described above, sensors and maps may be used for navigation of an AV. However, an AV may not utilize the most accurate sensors and/or a map (whether an HD map or a SD map) may not be available for the particular portion of the vehicle transportation network in which the AV is traveling. Moreover, sensors may fail while the AV is traveling, eliminating the availability of some data that would otherwise be provided to a decision-making component. Herein, an apparatus including a data determining interface between perception and decision making is introduced into a vehicle decision-making system that assures the decision-making components have at least the minimum data types needed as input. The interface allows the AV to navigate using a map as input (an HD map, a SD map, or both) or to navigate without the use of a map, such as using only sensors (e.g., cameras) and a global positioning system (GPS) unit or sensor as its main navigation tools. The interface may be referred to herein as a data determining interface because it determines what data to output to a decision-making component depending on the scenario occurring in the operational environment to which the decision-making component is directed. The data determining interface can generate data, filter data, or both from the perception system so that the decision-making components produce consistent, accurate decisions (e.g., candidate vehicle control actions) regardless of what data is available from the perception system. As a result, the decision-making component is more robust and may be simplified (e.g., by being designed to require only certain inputs for a particular scenario.

Figure 4:
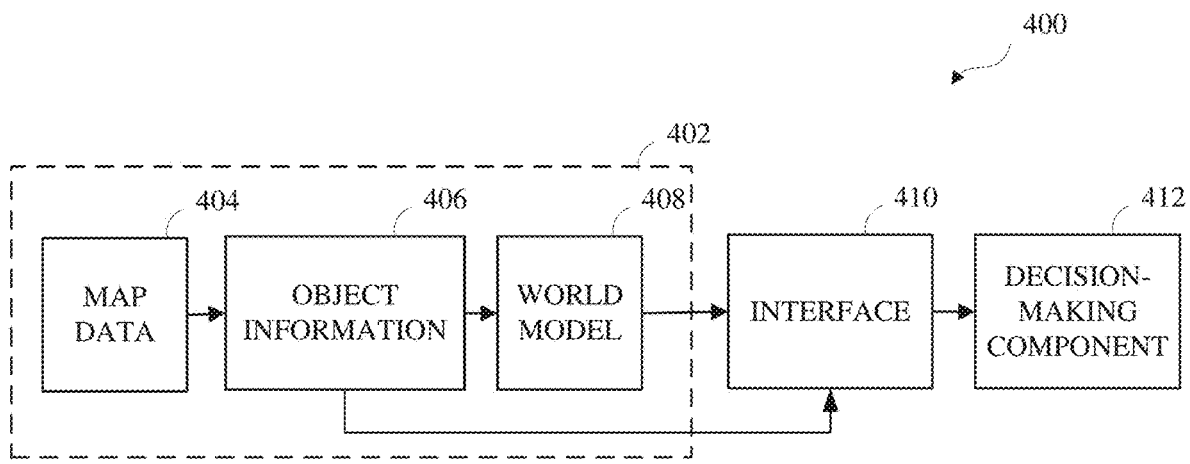
FIG. 4 is a diagram of a data pipeline of a vehicle decision-making system including a data determining interface according to the teachings herein.

FIG. 4 is a diagram of a data pipeline 400 of a vehicle decision-making system including a data determining interface 410 according to the teachings herein. As mentioned previously, the interface is between perception and decision-making. As shown in FIG. 4, the data determining interface 410 is between perception system 402 and a decision-making component 412. The perception system 402 may comprise map data 404, an object information module 406, and a world model 408. In some implementations, the perception system 402 receives the map data 404 as input such that a map is not part of the perception system 402.

The map data 404 comprises any map data representative of the operational environment about the AV, including the vehicle transportation network. The map data 404 may include HD map data, SD map data, or some combination of HD map data and SD map data. For example, some areas of the operational environment may be represented by HD map data, while others are represented by SD map data. In some implementations, discussed in further detail below, the map data 404 may not be available for some AVs and/or may not be available for at least a portion of the vehicle transportation network.

The object information module 406 can receive raw perception data from sensors of the AV, such as the sensor 136. The sensors 136 may be include a camera (e.g., an image camera), LiDAR, a GPS sensor or unit, or any other sensor or combination of sensors that images, captures, identifies, or otherwise detects the operational environment around the AV. The object information module 406 can receive data from other sources, such as from fixed infrastructure cameras, other vehicles within the vehicle transportation system, a remote vehicle support system, etc., through wired and wireless signal links described above with reference to FIG. 2. The object information module 406 can perform object association. For example, object association can include determining objects from the received signals. Object association may associate location information within each of the signals with a respective road object, e.g., a vehicle, a pedestrian or non-motorized vehicle, etc., within the vehicle transportation network. The object information module 406 may generate or maintain a state for at least some of the determined objects, such as a velocity (when an object is a dynamic object and not a static object), a pose, a geometry (such as width, height, and depth), a classification (e.g., bicycle, large truck, pedestrian, road sign, etc.), a lane location, or some combination thereof.

The world model 408 can output object information, including separately tracked objects with a respective trajectory for use in decision making of the AV. The world model 408 can output localization information, e.g., the position of objects relative to roads and/or lanes in the vehicle transportation network. The world model 408 may receive the sensed objects over time from the object information module 406. Using data such as the location, and heading and velocity information where available, sensed objects may be fused where appropriate. That is, the data associated with each object may be compared to determine whether respective objects identified by separate sources (e.g., from separate signals input to the object information module 406) may be the same object. Any technique for comparing the data of each sensed object may be used. The more similar the data is, the more likely two objects are the same. The data of the objects determined to be the same object are fused to generate an object, including a tracked object at positions over time (e.g., a fused trajectory).

In some implementations, some or all components of the perception system 402 can correspond to component(s) of the autonomous vehicle operational management system 300. In an example, the object information module 406, the world model 408, or both correspond to an operational environment monitor 320. The map data 404 may be part of an operational environment monitor 320 or more likely may be otherwise incorporated elsewhere, such as stored in memory 134 of the vehicle 100 and/or received remotely from the communication unit 132. Although the perception system 402 is shown as a single component of the data pipeline 400, at least some components of the perception system 402 may be duplicated (e.g., because multiple scenarios are indicated by the detected objects). For example, a single world model 408 may be used for all operational environment monitors 320, while a respective object information module 406 (e.g., each associated with an object within a scenario) may be used for each operational environment monitor 320. Other variations are possible.

The decision-making component 412 recommends an action (e.g., a candidate vehicle control action) for the AV, such as GO, YIELD/EDGE, or STOP. The action may be performed automatically by the AV. For example, the action may be performed by a processor of the AV, such as the processor 133, controlling one or more of brakes, acceleration (e.g., an accelerator pedal), steering (e.g., a steering wheel), etc., of the AV. The action may be performed by an ADAS in some implementations. The decision-making component 412 can correspond to components of the autonomous vehicle operational management system 300. In an example, the decision-making component 412 corresponds to a model of an SSOCEM 330. Accordingly, more than one decision-making component 412 may be used in implementations of the teachings herein. Outputs (e.g., candidate actions) from respective decision-making components 412 may be used to select a control action for the AV, such as doing the selection using the AVOMC 310 described previously.

Where the vehicle operational environment is such that multiple decision-making components 412 are required (e.g., because multiple scenarios are indicated by the detected objects), a respective data determining interface 410 may be associated with each decision-making component 412. This is because, as described in more detail below, the data determining interface 410 may be designed to determine, generate, or otherwise produce outputs required by a particular decision-making component 412 using different data sources of an AV. In some implementations where an AV incorporates an autonomous vehicle operational management system, the autonomous vehicle operational management system 300 may be modified to include a data determining interface 410 between respective operational environment monitors 320 and SSOCEMs 330, such as between the intersection monitor 323 and the intersection model such as intersection-SSOCEM 332.

Details of variations in implementations of a data determining interface 410 are next described with reference to FIG. 5, which is a flow chart of a method 500 for vehicle decision-making. The method 500 may be performed by a computer, processor, a controller, or any combination of hardware, with or without software. The method 500 may be performed by the vehicle, such as by the processor 133, or may be performed remotely at least in part, such as by a processor or other hardware and optionally software at remote assistance support incorporating communication device 240. The method 500 may be performed, at least in part, by the data determining interface 410.

At 502, operational environment data is received, produced, or both, while the vehicle is traversing a vehicle transportation network. The operational environment data is from at least two data sources and includes data associated with objects external to the vehicle. The objects external of the vehicle may be static objects, dynamic objects, pedestrians, remote vehicles, vehicle transportation network geometry, etc., or combinations thereof. The operational environment data has operational environment data types.

In some implementations, the operational environment data may be produced by a perception system, such as the perception system 402. The operational environment data may correspond to stored data, such as the map data 404, that has operational environment data types including lane/road locations, static object sizes and locations, etc. The operational environment data may correspond to information received from raw perception data or produced using the raw perception data. For example, the operational environment data may be or include raw perception such corresponding to that received by the object information module 406 and produced by the world model 408 described above. The operational environment data may be data produced by the world model 408 for different data types, such as a traffic light state, a drive goal list, a lane level route plan, a GPS position/dynamic pose of objects, etc., or combinations thereof.

The operational environment data identifies a distinct vehicle operation scenario. For example, the distinct vehicle operation scenario may correspond to an N-way stop sign interaction, a traffic light unprotected turn intersection, a pedestrian on a crosswalk interaction, a controlled intersection, an uncontrolled intersection, a dynamic obstacle presence, a static obstacle presence, a lane change, etc., or combinations thereof. Some examples of vehicle operation scenarios were described above with regards to FIG. 3. As is clear from that description, the operational environment data may identify more than one distinct vehicle operation scenario.

At 504, the operational environment data is modified to determine output data for data types needed to determine a candidate vehicle control action using a decision-making component. In some implementations, a decision-making component may be a scenario-specific operational control evaluation model of the distinct vehicle operation scenario that, when solved, produces a candidate vehicle control action, such as a SSOCEM 330 described with regards to FIG. 3. In these implementations, modifying the operational environment data determines output data for data types needed to solve the SSOCEM. Where more than one distinct vehicle operation scenario is identified, more than one decision-making component may be used and hence more than one candidate vehicle control action may result. For example, scenario-specific operational control evaluation model(s) may be part of a decision-making system, such as the system 300, that recommends a vehicle control action for the vehicle using candidate vehicle control action(s) as input.

Figure 5:
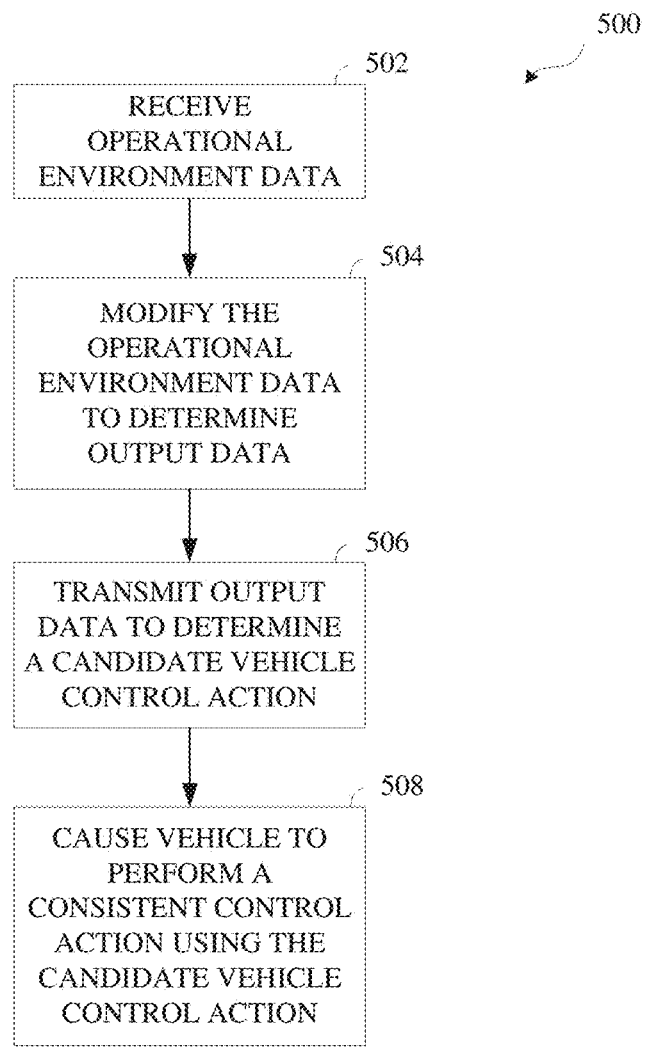
FIG. 5 is a flow chart of a method for decision-making for a vehicle using a data determining interface according to the teachings herein.

Although not shown in FIG. 5, the method 500 can include determining whether the operational environment data types match the data types needed to determine the candidate vehicle control action before the modifying. Other details of the data types needed by a decision-making component to determine a candidate vehicle control action and modifications to the operational environment data are described below starting with the example of FIG. 6.

At 506, the output data is transmitted to the decision-making component to output the candidate vehicle control action. This causes the vehicle, at 508, to perform a vehicle control action for navigating the distinct vehicle operation scenario within the vehicle transportation network. The vehicle control action may be selected from any available candidate control action (e.g., from different decision-making components when used). As described above, a vehicle control component performs the vehicle control action for the distinct vehicle operation scenario. The vehicle control component may be any part of the vehicle that automatically responds to the vehicle control action without operator intervention. For example, the vehicle control component is part of a braking system, an acceleration system, a steering system, or some combination thereof.

While not expressly shown in FIG. 5, the method 500 repeats for a plurality of arbitration points (i.e., points where vehicle control actions are output) while the autonomous or semi-autonomous vehicle navigates distinct vehicle operation scenarios while traversing the vehicle transportation network.

Figure 6:
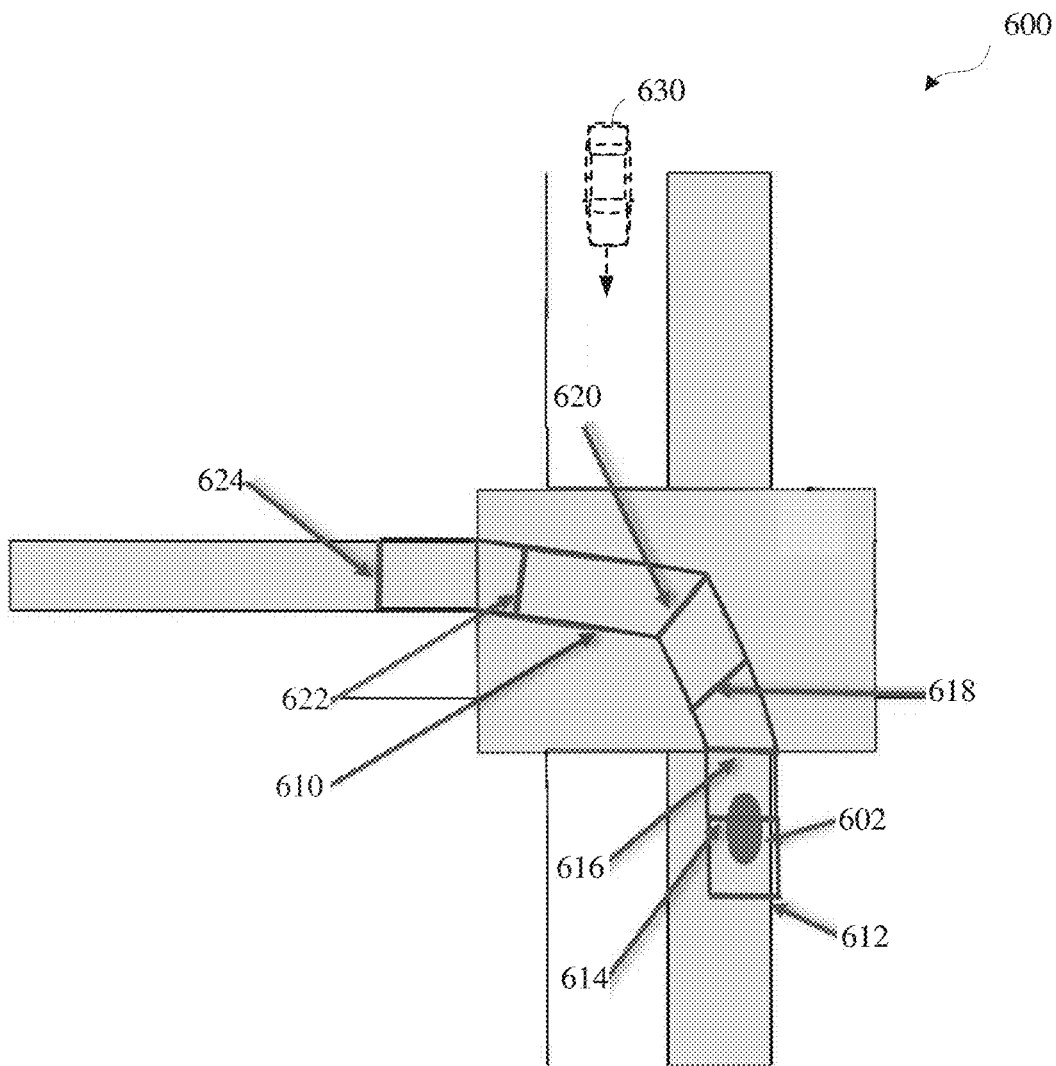
FIG. 6 is a diagram of an intersection that is used to explain certain features of this disclosure.

FIG. 6 is a diagram of an intersection 600 that is used to explain certain features of this disclosure. The intersection 600 is a T-shaped intersection showing a vehicle 602 progressing along a vehicle path 604 that takes a left turn into, for example, a parking lot. Shading in FIG. 6 indicates the drivable area for the vehicle 602. Arbitration points along the vehicle path 610 include at least the vehicle position 612 approaching a lane line segment, the vehicle position 614 before the lane line segment, the vehicle position 516 at the line segment, the vehicle position 618 after passing the lane line segment, the vehicle position 620 before crossing a next lane line segment, the vehicle position 622 after crossing the next lane line segment, and the vehicle position 624 within the goal lane line segment. In some implementations, one or more objects are located within or approaching the intersection 600. In the example shown, the object is a dynamic object, e.g., a vehicle 630, approaching the intersection 600 from the direction opposite to the vehicle 602.

Figure 7:
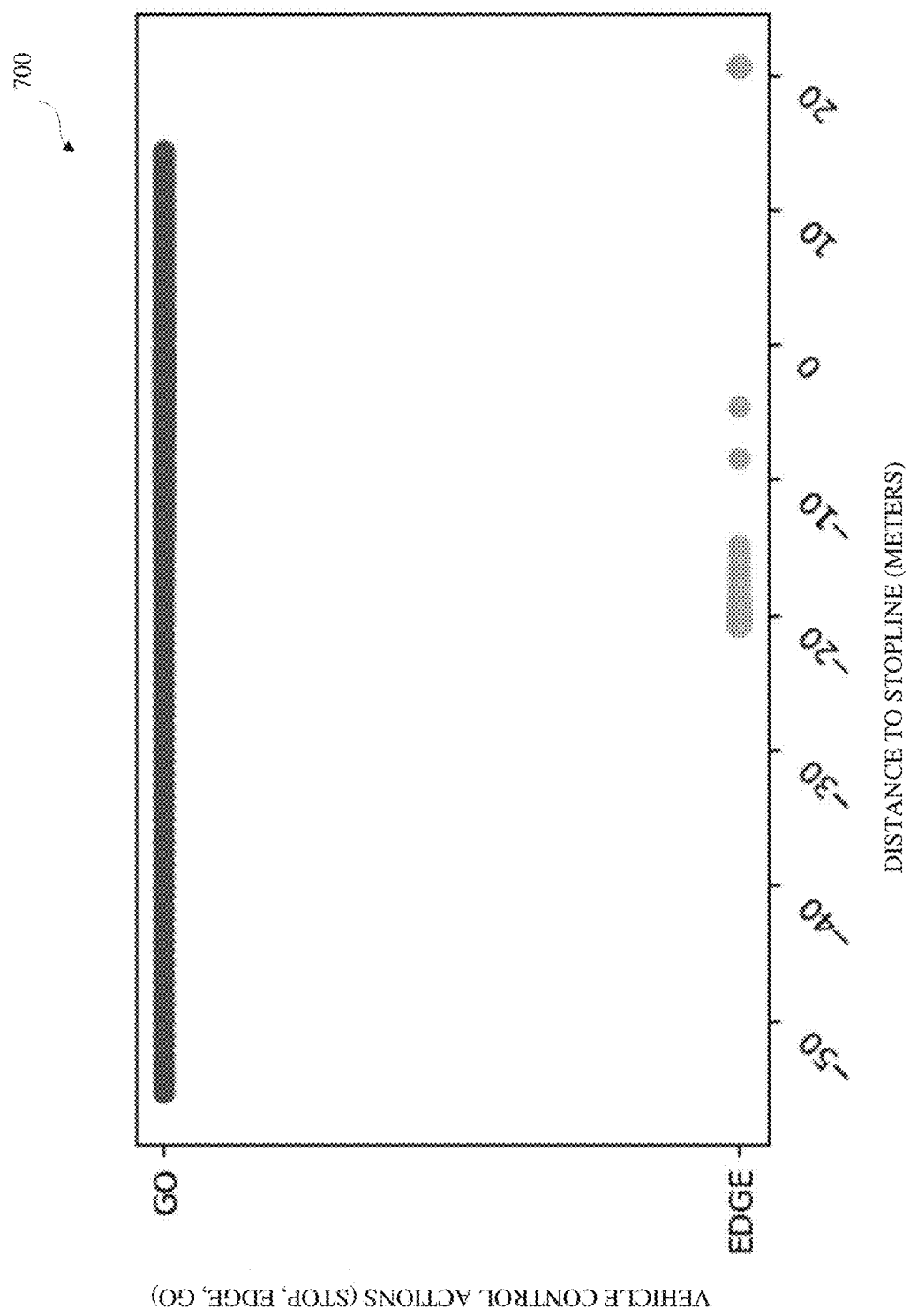
FIG. 7 is a plot of decision-making of an operator of a vehicle traversing the intersection of FIG. 6.

FIG. 7 is a plot 700 of decision-making of an operator of a vehicle traversing the intersection 600 of FIG. 6. The distinct vehicle operational scenario may be referred to as an unconstrained-unconstrained T-shaped intersection because there are no stop signs or other traffic control devices for either the vehicle 602 or the vehicle 630. As can be seen from the plot 700, the operator (i.e., a human) has an unimpeded path for the left turn but nonetheless yields/edges as they approach the intersection 600 to assess the intersection 600.

FIG. 7 is an example of how the data types needed to determine a candidate vehicle control action (here, stop, edge, or go) may be defined. Given at least two high-quality data sources, such as a HD map, LiDAR, high-resolution image cameras, or combinations thereof, a decision-making system such as the system 300 will produce vehicle control actions for an AV in the same distinct vehicle operation scenario in a vehicle transportation network. That is, the AV would start to edge at a similar (e.g., almost the same) distance as the human operator as shown in FIG. 7, and the AV will also proceed through the intersection 600. In this example, the candidate vehicle control actions are the same for at least some points. Accordingly, the data types needed to determine the candidate vehicle control action may comprise a minimum set of data types that are required to produce candidate vehicle control actions consistent with vehicle control actions performed by a driver during the distinct vehicle operation scenario. Where the decision-making component is a scenario-specific operational control evaluation model, such as the SSOCEM 330 for example, the data types needed to solve the scenario-specific operational control evaluation model may comprise a minimum set of data types that are required to produce candidate vehicle control actions consistent with vehicle control actions performed by a driver during the distinct vehicle operation scenario. In some implementations, the data types needed to solve the scenario-specific operational control evaluation model comprise a minimum set of data types that are required to solve the scenario-specific operational control evaluation model. The data types needed to produce consistent control actions vary based on the distinct vehicle operation scenario.

The data determining interface described herein allows the same or substantially similar results when different data sources are used, such as lower-resolution image cameras, a SD map or no map, no LiDAR, etc., than described above. More particularly, the data types needed to produce a candidate vehicle control action may not correspond to the data types provided by the at least two data sources providing the operational environment data (e.g., at 502). This can happen in several situations. In an example, an AV in which a data determining interface, such as the data determining interface 410, is installed may have different data sources from another AV (e.g., an ideal AV), such as an AV having a different perception system 402. In addition, or alternatively, the same AV may have different data sources over time. In these examples, the same data determining interface may be used between perception and decision-making to modify the operational environment data so that the needed data types are output from the data determining interface.

In some implementations of these examples, the at least two data sources may change from first data sources to second data sources while the vehicle is traversing the vehicle transportation network such that the operational environment data types provided by the data sources switch from first operational environment data types to second operational environment data types. In such a situation, the first data sources include at least one data source different from the second data sources. For example, an AV may have a HD map as a data source for a portion of the vehicle transportation network, but the HD map may not be a data source for another portion of the vehicle transportation network. No map may be available as a data source, or a SD map may be available as a data source. In another example, a data source such as an infrastructure camera may not be available until an AV enters an intersection and is no longer available when the AV exits the intersection.

In the data determining interface, such as the data determining interface 410, the operational environment data types can comprise first operational environment data types when the at least two data sources comprise first data sources, and the operational environment data types can comprise second operational environment data types when the at least two data sources comprise second data sources. At least one of the second data sources is different from the first data sources, and at least one of the first operational environment data types is different from the second environmental data types. The data determining interface is configured so that the output data is the same whether the at least two data sources comprise the first data sources or the second data sources. Because the output data is the same at a particular decision point, the candidate vehicle control action determined by the decision-making component would be the same.

In some implementations, modifying the operational environment data at 504 can include filtering out the operational environment data having operational environment data types that differ from the data types needed by the decision-making component to determine the candidate vehicle control action. In some implementations, modifying the operational environment data at 504 can include generating, using at least some of the operational environment data, the output data for a missing data type of the data types needed by the decision-making component to determine the candidate vehicle control action where the operational environment data types do not include the missing data type (i.e., where a missing data type of the data types exists such that none of the operational environment data corresponds to the missing data type). In some implementations, both the filtering and the generating are included in modifying the operational environment data at 504.

In the various situations described above, the data determining interface can provide consistent output using different data sources as the at least two data sources. For example, a map may be excluded and only a global positioning system (GPS) sensor and one or more camera sensors may be included in the first data sources, the second data sources, or both. That is, the AV navigates without any map under some circumstances. The one or more data types needed for the decision-making component related to the relative relationship of the AV to the geometry of the vehicle transportation network can be determined by modifying at least some of the image data and relating it to the position data from the GPS, for example. In some implementations, the first data sources comprise a sensor and a high-definition map, and the second data sources comprise the sensor and a standard-definition map. In variations of these implementations, the sensor is other than LiDAR. For example, the sensor may be a high-quality or a low-quality image camera. In some implementations, LiDAR and a high-definition map are excluded from the first data sources, the second data sources, or both.

Figure 8A:
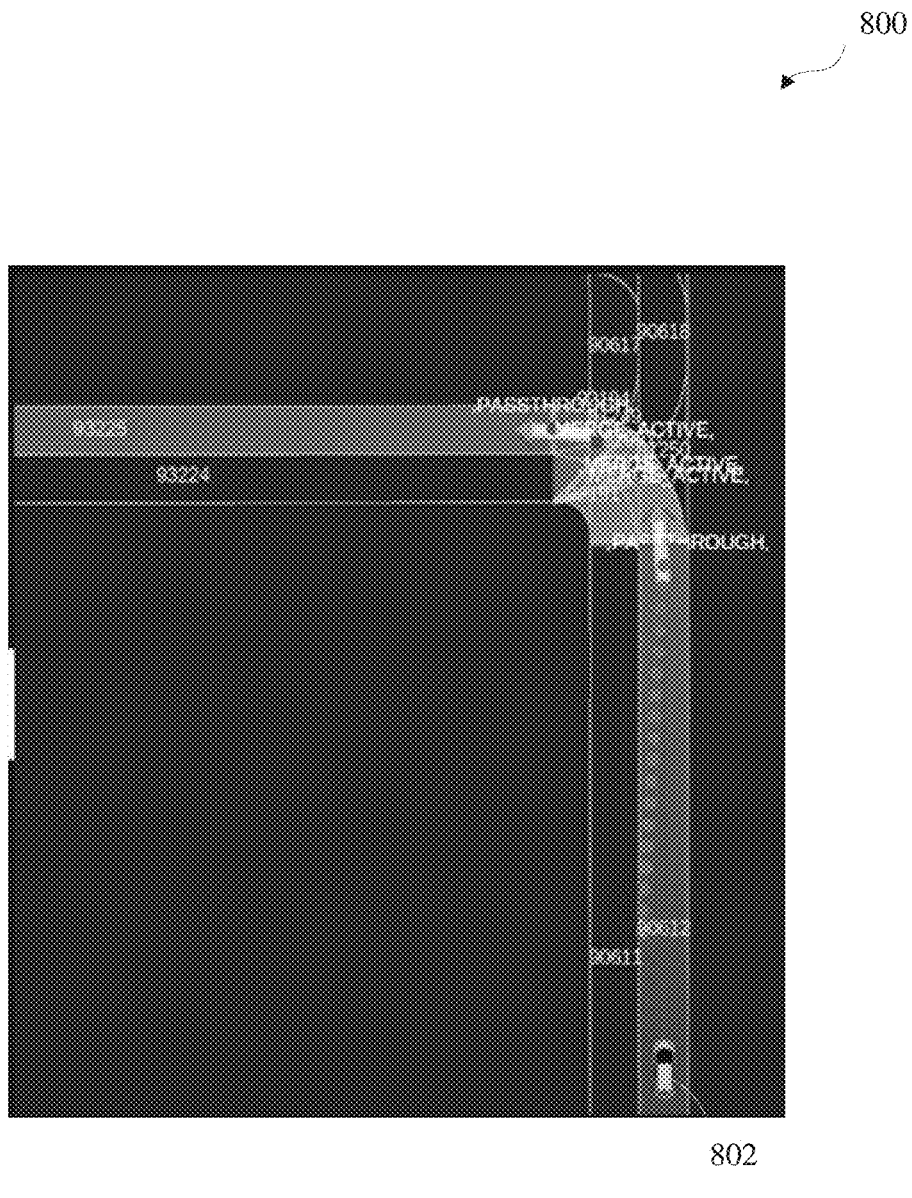
FIG. 8A is a diagram of an intersection traversed by a vehicle using a data determining interface according to the teachings herein.
Figure 8B:
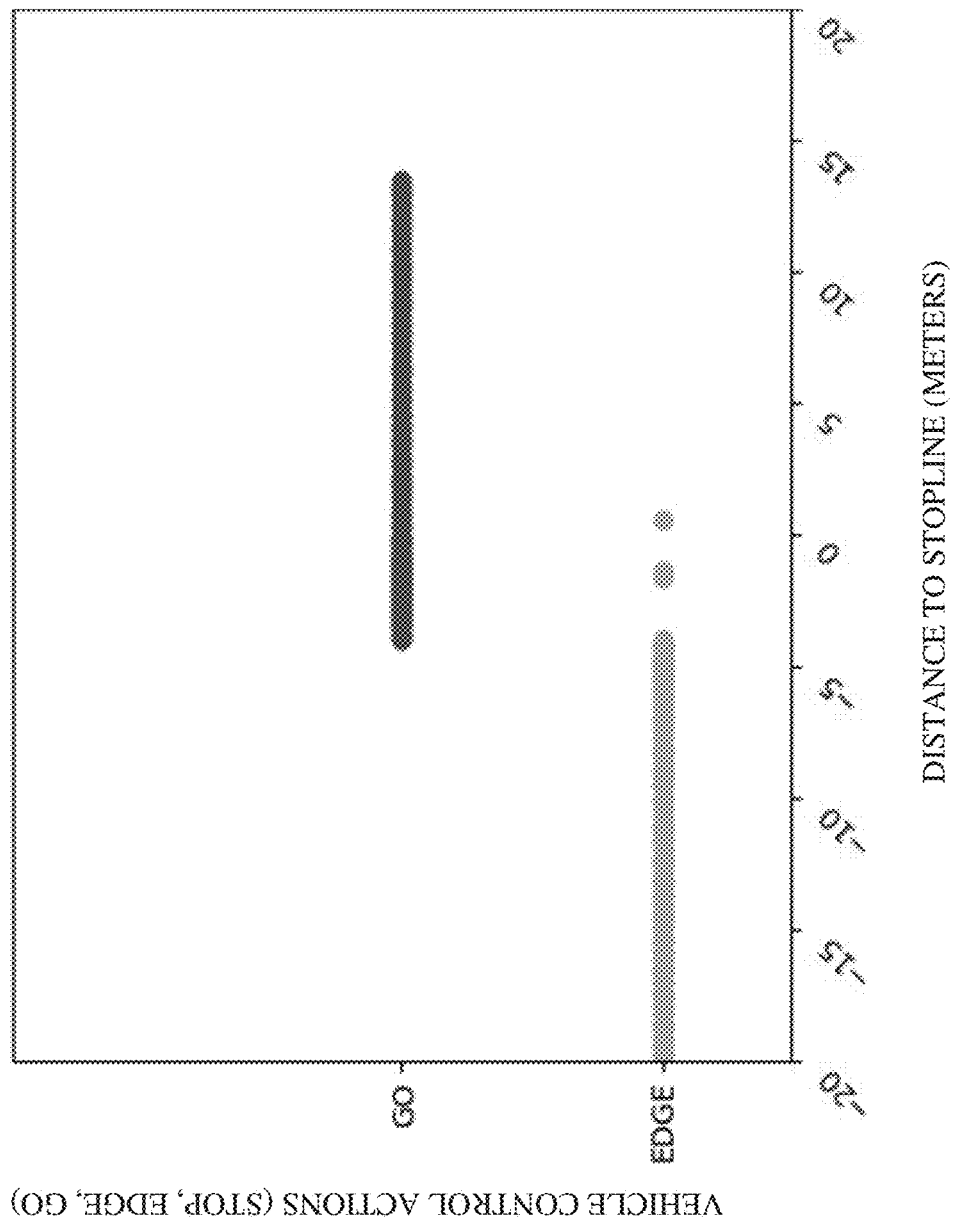
FIGS. 8B and 8C are plots of decision-making of the vehicle traversing the intersection based on different data sources.
Figure 8C:
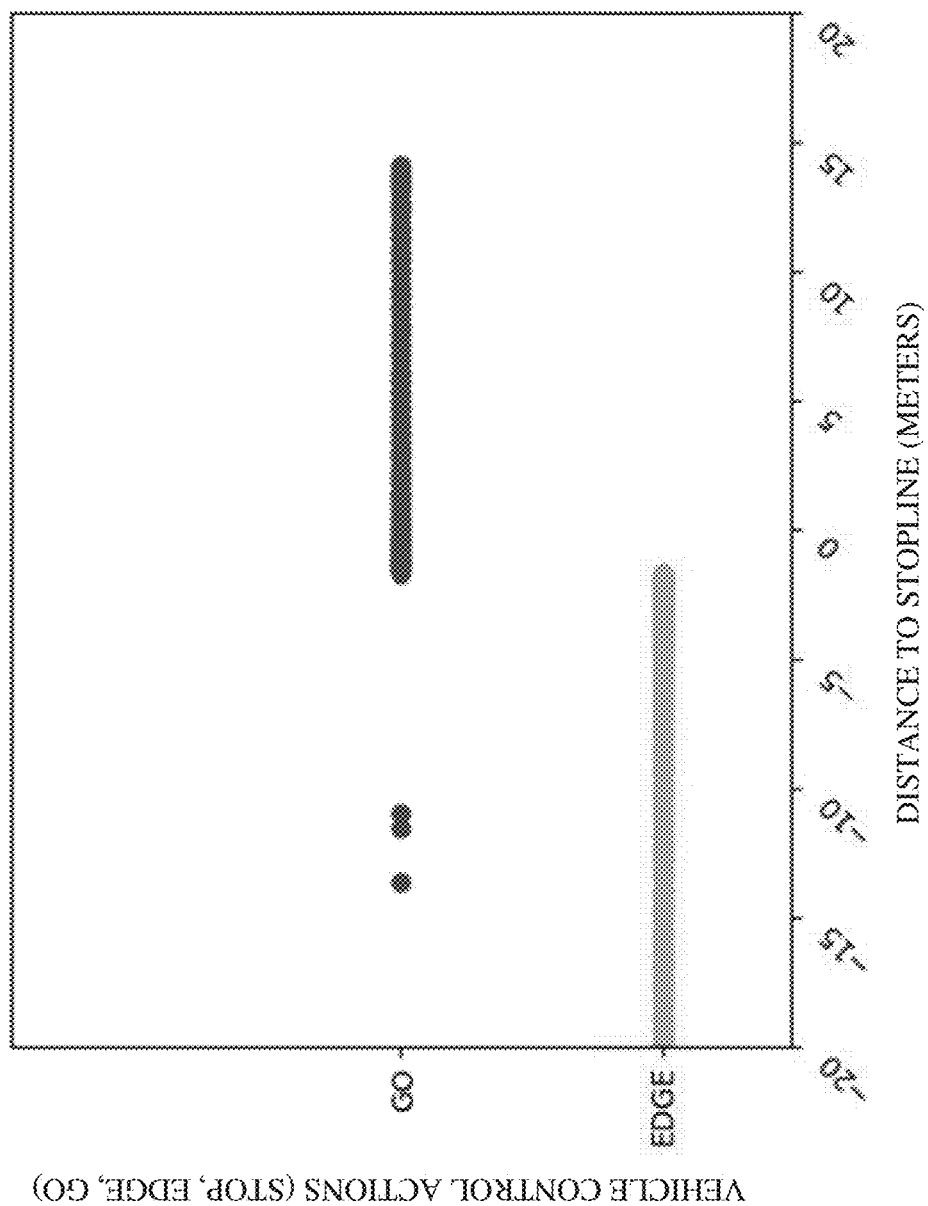
Figure 9A:
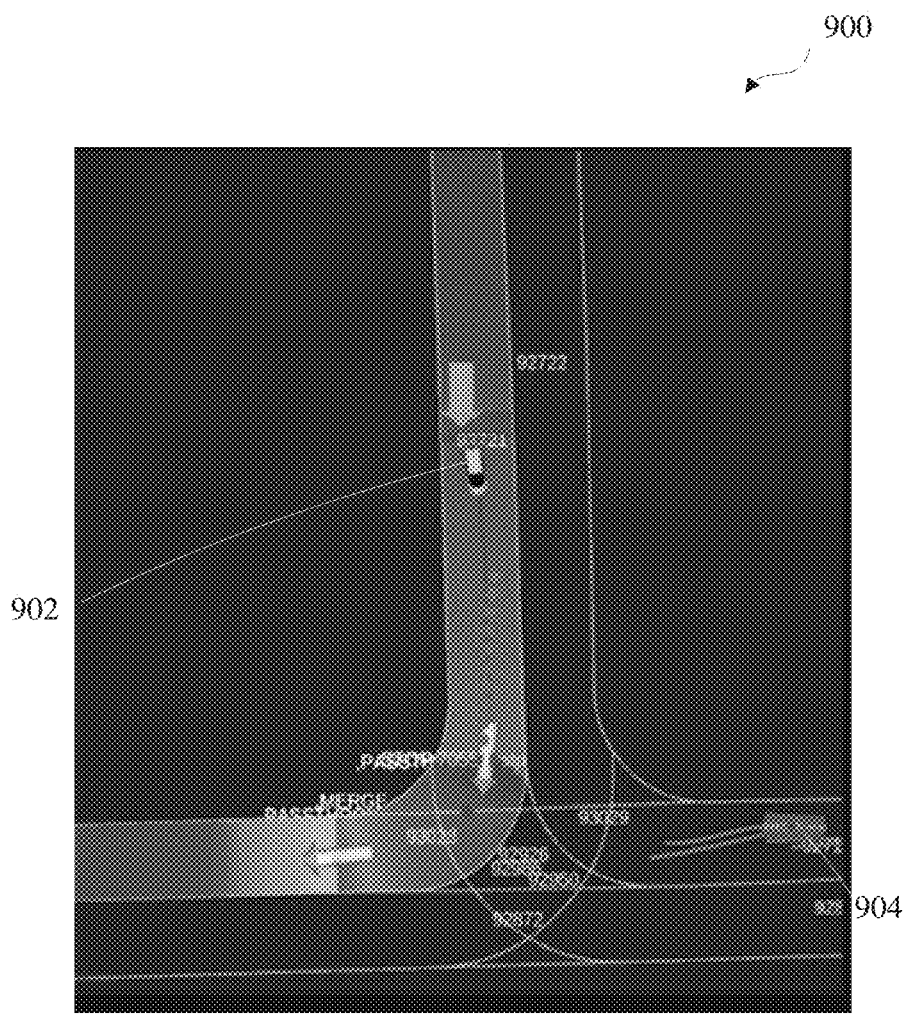
FIG. 9A is a diagram of an intersection traversed by a vehicle using a data determining interface according to the teachings herein.

Examples of how the candidate vehicle control actions are consistently determined by a decision-making component due to the modification of the operational environment data by the data determining interface described herein are shown in FIGS. 8A-8C and FIGS. 9A-9C. Each of FIGS. 8A and 9A is a diagram of an intersection traversed by a vehicle, such as a vehicle 100, using a data determining interface according to the teachings herein. In each, the distinct vehicle operation scenario is an intersection of the vehicle transportation network.

In FIG. 8A, the intersection 800 is similar to the intersection 600 except that the intersection 800 is an uncontrolled-uncontrolled intersection without a dynamic object. FIG. 8B is a plot of decision-making of the AV 802 traversing the intersection 800 where the data sources include, among other data sources, a HD map that provides map data such as the map data 404. Accordingly, one of the data types provided by the perception system, such as the perception system 402, is lane line markings. In contrast, FIG. 8C is a plot of decision-making AV 802 traversing the intersection 800 based on different data sources. More particularly, a SD map is available as a data source—the at least two data sources do not include the HD map. The data types needed to determine the candidate vehicle control action can include the line lane markings about the AV 802. Modifying the operational environment data at 504 can include determining data representing the positions, orientations, lengths, etc. of the line lane markings. As can be seen by a comparison of the plots of FIGS. 8B and 8C, the candidate vehicle control actions determined by the decision-making component are consistent (e.g., the same) over most of the arbitration points and, where they differ, the difference in operation would not be discernable to an observer.

Figure 9B:
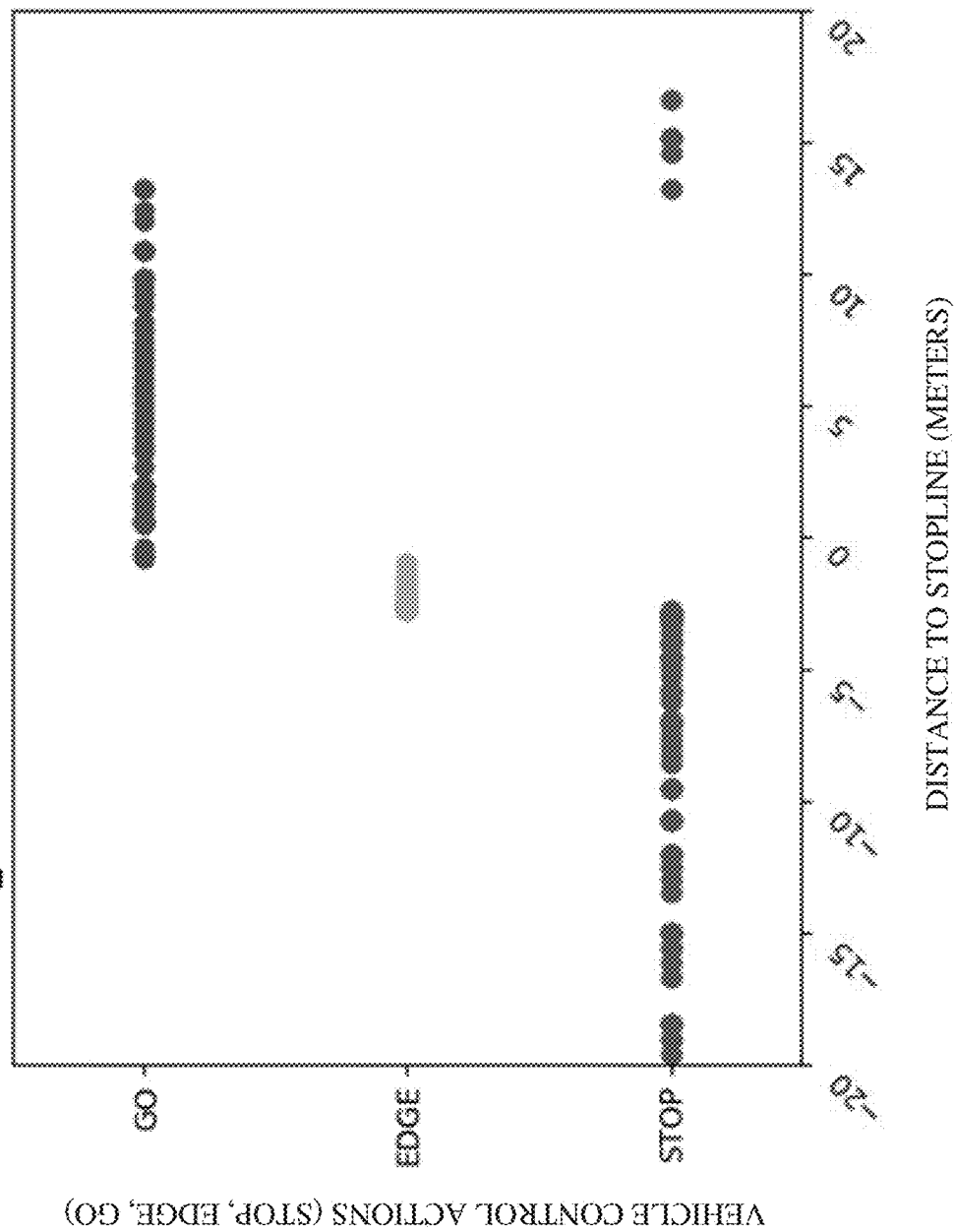
FIGS. 9B and 9C are plots of decision-making of the vehicle traversing the intersection based on different data sources.
Figure 9C:
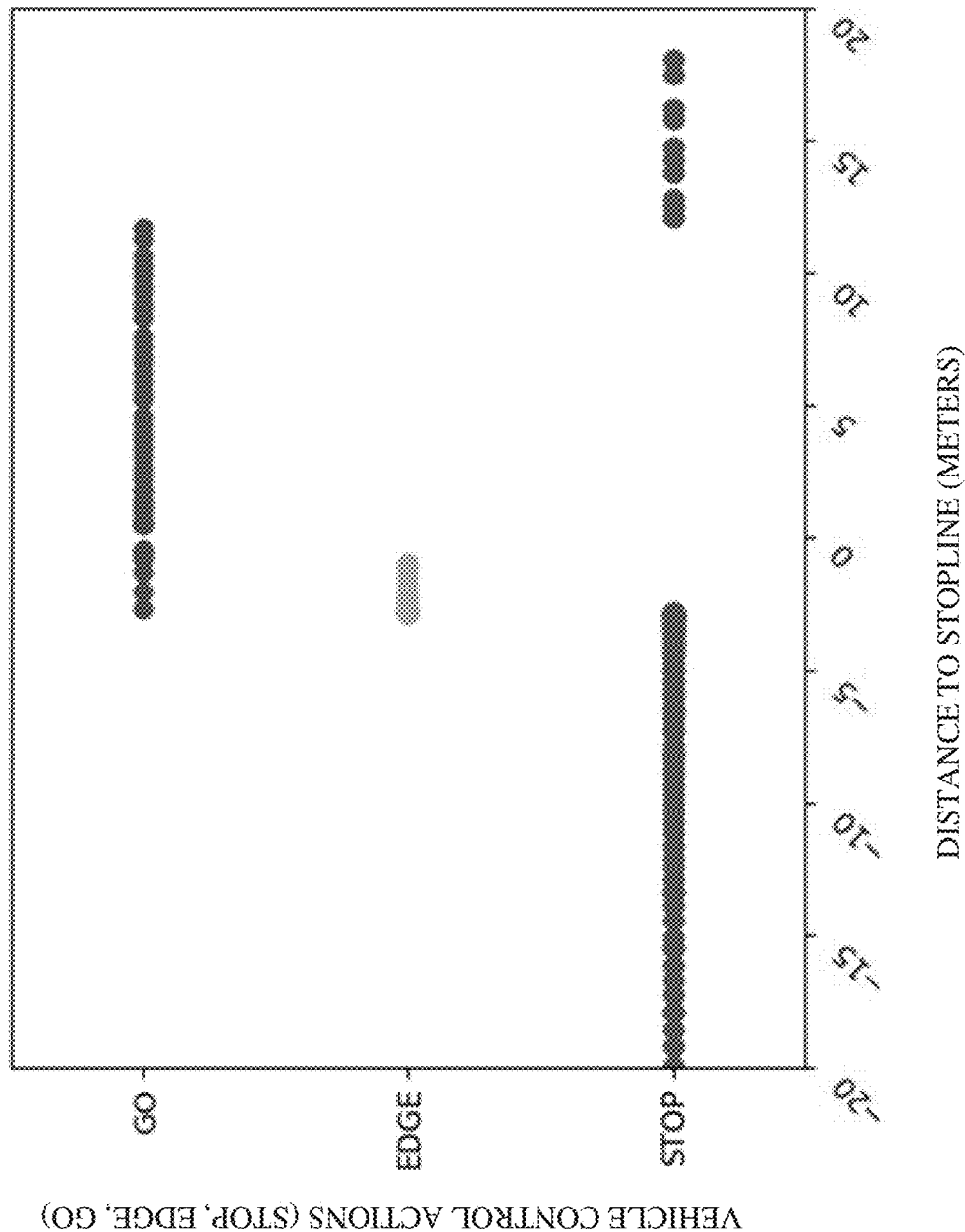

In FIG. 9A, the intersection 900 is similar to the intersection 600 except that the intersection 900 is a stop-uncontrolled intersection with a dynamic object forming an obstacle. FIG. 9B is a plot of decision-making of the AV 902 traversing the intersection 900 while including the vehicle 904 where the data sources include, among other data sources, a HD map that provides map data such as the map data 404. Accordingly, one of the data types provided by the perception system, such as the perception system 402, is lane line markings. In contrast, FIG. 9C is a plot of decision-making of the AV 902 traversing the intersection 900 based on different data sources. More particularly, a SD map is available as a data source—the at least two data sources do not include the HD map. The data types needed to determine the candidate vehicle control action can include the line lane markings about the AV 902, the position of the vehicle 904 relative to the line lane markings, or both. Modifying the operational environment data at 504 can include determining data representing the positions, orientations, lengths, etc. of the line lane markings, the position of the vehicle 904 relative to the line lane markings, or both. As can be seen by a comparison of the plots of FIGS. 9B and 9C, the candidate vehicle control actions determined by the decision-making component are consistent (e.g., the same) over most of the arbitration points and, where they differ, the difference in operation would not be discernable to an observer.

In summary, the data determining interface lies between perception and decision-making, taking inputs from sensors and map(s), where available, and providing a consistent, acceptable output to a decision-making component of an AV. A data determining interface may be respectively associated with separate decision-making components that together can form a decision-making system. The data determining interface addresses situations where multiple types of data are available, but the decision-making component needs specific data types as input. In some cases, the interface may define the specific data types needed and generate those inputs from the multiple types of data when the specific data types are not available. The specific data types may be the minimum data types for a particular decision-making module that are needed to consistently recommend an acceptable (e.g., the correct) action. In at least some cases, the acceptable action corresponds to one an operator of the vehicle would make under the same or similar circumstances.

The data determining interface can, in some implementations, simplify the design of a decision-making component by reducing the amount of data considered to determine a vehicle control action. The use of a decision-making component can be improved because, by using the data determining interface to produce the data types needed for a consistent vehicle control action, the decision-making component can be used with a variety of sensors and maps and even in the absence of maps. That is, the decision-making component is robust to differing quality and types of data sources, such as sensor quality, sensor failures, sensor type, map quality, map presence/absence, etc., because the data determining interface can modify the operational environment data received from the data sources to produce the data types needed.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or" unless specified otherwise, or clear from context. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. An apparatus for vehicle decision-making, the apparatus comprising:
    a perception system configured to:
        produce, while a vehicle is traversing a vehicle transportation network, operational environment data using at least two data sources, wherein the operational environment data includes data associated with objects external to the vehicle; and
        identify, using the operational environment data, a distinct vehicle operation scenario;
    a decision-making component that comprises a scenario-specific operational control evaluation model of the distinct vehicle operation scenario that, when solved, produces a candidate vehicle control action; and
    a data determining interface between the perception system and the decision-making component that is configured to:

receive, from the perception system, the operational environment data having operational environment data types;

modify the operational environment data to determine output data for data types needed to solve the scenario-specific operational control evaluation model, wherein:

the operational environment data types comprise first operational environment data types when the at least two data sources comprise first data sources, the operational environment data types comprise second operational environment data types when the at least two data sources comprise second data sources, at least one of the second data sources is different from the first data sources, at least one of the first operational environment data types is different from the second operational environment data types, and the output data is the same whether the at least two data sources comprise the first data sources or the second data sources; and transmit the output data to the decision-making component to output the candidate vehicle control action so as to cause the vehicle to perform the candidate vehicle control action for navigating the distinct vehicle operation scenario.

2. The apparatus of claim 1, wherein the data types needed to solve the scenario-specific operational control evaluation model comprise a minimum set of data types that are required to solve the scenario-specific operational control evaluation model.

3. The apparatus of claim 1, wherein the data types needed to solve the scenario-specific operational control evaluation model comprise a minimum set of data types that are required to produce candidate vehicle control actions consistent with vehicle control actions performed by a driver during the distinct vehicle operation scenario.

4. The apparatus of claim 1, wherein to modify the operational environment data comprises to filter out the operational environment data having a data type other than the data types needed to solve the scenario-specific operational control evaluation model.

5. The apparatus of claim 1, wherein a missing data type of the data types exists such that none of the operational environment data corresponds to the missing data type, and to modify the operational environment data comprises determining the output data corresponding to the missing data type using at least some of the operational environment data.

6. The apparatus of claim 1, wherein a map is excluded and only a global positioning system (GPS) sensor and one or more camera sensors are included in at least one of the first data sources or the second data sources.

7. The apparatus of claim 1, wherein light detection and ranging (LiDAR) and a high-definition map are excluded from at least one of the first data sources or the second data sources.

8. The apparatus of claim 1, wherein:

the scenario-specific operational control evaluation model is part of a decision-making system that recommends a vehicle control action for the vehicle using the candidate vehicle control action as input.

9. An apparatus for vehicle decision-making, the apparatus comprising:

a data determining interface configured to:

receive, while a vehicle is traversing a vehicle transportation network, operational environment data using at least two data sources, wherein:

the operational environment data includes data associated with objects external to the vehicle and having operational environment data types, and the objects establish a distinct vehicle operation scenario;

modify the operational environment data to determine output data for data types needed to determine a candidate vehicle control action using a decision-making component, wherein:

the operational environment data types comprise first operational environment data types when the at least two data sources comprise first data sources, the operational environment data types comprise second operational environment data types when the at least two data sources comprise second data sources, at least one of the second data sources is different from the first data sources, at least one of the first operational environment data types is different from the second operational environment data types, and the output data is the same whether the at least two data sources comprise the first data sources or the second data sources; and transmit the output data to the decision-making component to output the candidate vehicle control action so as to cause the vehicle to perform a vehicle control action for navigating the distinct vehicle operation scenario within the vehicle transportation network, the vehicle control action selected from any available candidate control action.

10. The apparatus of claim 9, wherein to modify the operational environment data comprises to:

filter out the operational environment data having operational environment data types that differ from the data types needed by the decision-making component to determine the candidate vehicle control action.

11. The apparatus of claim 9, wherein to modify the operational environment data comprises to:

generate, using at least some of the operational environment data, the output data for a missing data type of the data types needed by the decision-making component to determine the candidate vehicle control action where the operational environment data types do not include the missing data type.

12. The apparatus of claim 9, wherein the data determining interface is configured to:

determine whether the operational environment data types match the data types needed to determine the candidate vehicle control action.

13. The apparatus of claim 9, wherein:

the distinct vehicle operation scenario comprises an intersection of the vehicle transportation network, the at least two data sources do not include a high-definition map, the data types needed to determine the candidate vehicle control action include a relationship of another vehicle relative to line lane markings, the operational environment data types exclude the relationship of another vehicle relative to line lane markings, and to modify the operational environment data comprises to determine the output data for the relationship of another vehicle relative to line lane markings.

14. The apparatus of claim 9, wherein the data types needed to determine the candidate vehicle control action comprise a minimum set of data types that are required to produce candidate vehicle control actions consistent with vehicle control actions performed by a driver during the distinct vehicle operation scenario.

15. The apparatus of claim 9, wherein the first data sources comprise a sensor and a high-definition map, and the second data sources comprise the sensor and a standard-definition map.

16. The apparatus of claim 15, wherein the sensor is other than light detection and ranging (LiDAR).

17. A vehicle implementing vehicle decision-making, comprising:
a processor configured to:
receive, while the vehicle is traversing a vehicle transportation network, operational environment data using at least two data sources, wherein the operational environment data includes data associated with an object external to the vehicle; and
identify, using the operational environment data, a distinct vehicle operation scenario;
a data determining interface configured to:
modify the operational environment data to determine output data for data types needed by a decision-making component to determine a candidate vehicle control action responsive to the distinct vehicle operation scenario, wherein to modify the operational environment data comprises to, at least one of:
filter out the operational environment data having operational environment data types that differ from the data types needed by the decision-making component to determine the candidate vehicle control action, or
generate, using at least some of the operational environment data, the output data for a missing data type of the data types needed by the decision-making component to determine the candidate vehicle control action where the operational environment data types do not include the missing data type; and
transmit the output data to the decision-making component to determine the candidate vehicle control action; and
a vehicle control component configured to perform a vehicle control action for the distinct vehicle operation scenario, the vehicle control action selected from any available candidate control action.

18. The vehicle of claim 17, wherein:
the operational environment data types comprise first operational environment data types when the at least two data sources comprise first data sources,
the operational environment data types comprise second operational environment data types when the at least two data sources comprise second data sources,
at least one of the second data sources is different from the first data sources,
at least one of the first operational environment data types is different from the second operational environment data types, and
the output data is the same whether the at least two data sources comprise the first data sources or the second data sources.

19. The vehicle of claim 17, wherein:
the at least two data sources change from first data sources to second data sources while the vehicle is traversing the vehicle transportation network such that the operational environment data types switch from first operational environment data types to second operational environment data types,
the first data sources include at least one data source different from the second data sources, and
light detection and ranging (LiDAR) and a high-definition map are excluded from at least one of the first data sources or the second data sources.

20. The vehicle of claim 17, wherein:
the decision-making component comprises a scenario-specific operational control evaluation model of the distinct vehicle operation scenario that, when solved, produces the candidate vehicle control action, and
the vehicle control component is part of at least one of a braking system, an acceleration system, or a steering system.

* * * * *